United States Patent
Li et al.

(10) Patent No.: US 12,238,154 B2
(45) Date of Patent: Feb. 25, 2025

(54) MULTICAST SESSION ESTABLISHMENT METHOD AND NETWORK DEVICE

(71) Applicant: HUAWEI TECHNOLOGIES CO., LTD., Guangdong (CN)

(72) Inventors: Meng Li, Beijing (CN); Haiyang Sun, Beijing (CN); Yizhuang Wu, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/736,449

(22) Filed: May 4, 2022

(65) Prior Publication Data

US 2022/0263879 A1    Aug. 18, 2022

Related U.S. Application Data

(63) Continuation of application No. PCT/CN2019/116849, filed on Nov. 8, 2019.

(51) Int. Cl.
| | |
|---|---|
| *H04L 65/611* | (2022.01) |
| *H04L 65/1069* | (2022.01) |
| *H04L 65/80* | (2022.01) |

(52) U.S. Cl.
CPC ........ *H04L 65/611* (2022.05); *H04L 65/1069* (2013.01); *H04L 65/80* (2013.01)

(58) Field of Classification Search
CPC ..... H04L 65/611; H04L 65/1069; H04L 65/80
See application file for complete search history.

(56) References Cited

U.S. PATENT DOCUMENTS

| | | | | |
|---|---|---|---|---|
| 6,845,389 | B1* | 1/2005 | Sen | H04L 67/61 709/204 |
| 2002/0119821 | A1* | 8/2002 | Sen | A63F 13/795 463/42 |
| 2012/0185906 | A1* | 7/2012 | Doets | H04L 65/1069 725/126 |

(Continued)

FOREIGN PATENT DOCUMENTS

| | | |
|---|---|---|
| CN | 107995603 A | 5/2018 |
| CN | 108702724 A | 10/2018 |

(Continued)

OTHER PUBLICATIONS

3GPP TR 23.757 V0.1.0 (Oct. 2019), "3rd Generation Partnership Project; Technical Specification Group Services and System Aspects; Study on Architectural enhancements for 5G multicast-broadcast services (Release 17)," Oct. 2019, 11 pages.

(Continued)

*Primary Examiner* — Kristie D Shingles
(74) *Attorney, Agent, or Firm* — Fish & Richardson P.C.

(57) ABSTRACT

This application discloses a multicast session establishment method and a network device, and relates to the field of wireless communication technologies, to implement establishment of a multicast session based on a network architecture that has been deployed by an operator. In one example, when the multicast session is established, policy control, for example, quality of service QoS control, of the multicast session may be completed via a policy control network element or a session management network element in the network architecture that has been deployed by the operator.

13 Claims, 13 Drawing Sheets

(56) References Cited

U.S. PATENT DOCUMENTS

| | | | | |
|---|---|---|---|---|
| 2013/0107741 | A1* | 5/2013 | Huang | H04L 43/00 |
| | | | | 370/252 |
| 2016/0073146 | A1* | 3/2016 | Phillips | H04L 65/611 |
| | | | | 725/34 |
| 2016/0156691 | A1* | 6/2016 | Leeb | H04L 65/80 |
| | | | | 709/225 |
| 2016/0359551 | A1* | 12/2016 | Roy | H04L 65/103 |
| 2017/0078317 | A1* | 3/2017 | Gertner | H04L 63/1441 |
| 2019/0158985 | A1 | 5/2019 | Dao et al. | |
| 2019/0223250 | A1 | 7/2019 | Dao et al. | |
| 2020/0267513 | A1* | 8/2020 | Zhu | H04L 65/1033 |
| 2020/0329347 | A1* | 10/2020 | Prasad | H04W 88/16 |
| 2021/0076252 | A1* | 3/2021 | Wei | H04W 48/18 |
| 2021/0112379 | A1* | 4/2021 | Ge | H04W 76/12 |
| 2021/0281981 | A1* | 9/2021 | Li | H04L 65/611 |
| 2022/0159605 | A1* | 5/2022 | Li | H04W 60/00 |

FOREIGN PATENT DOCUMENTS

| | | |
|---|---|---|
| CN | 109699013 A | 4/2019 |
| CN | 109769150 A | 5/2019 |
| CN | 110167190 A | 8/2019 |
| CN | 110169104 A | 8/2019 |
| CN | 110383877 A | 10/2019 |
| WO | 2015185111 A1 | 12/2015 |
| WO | 2019080690 A1 | 5/2019 |
| WO | 2019136128 A1 | 7/2019 |
| WO | 2019154036 A1 | 8/2019 |

OTHER PUBLICATIONS

Huawei, HiSilicon, "Clarification on N6 Traffic Routing Information for Ethernet type PDU Session," 3GPP TSG-WG SA2 Meeting #135, S2-1908860, Split, Croatia, Oct. 14-18, 2019, 9 pages.
Huawei, HiSilicon, "IPTV solution for WWC," SA WG2 Meeting #128, S2-186762, Vilnius, Lithuania, Jul. 2-6, 2018, 8 pages.
Huawei, HiSilicon, "IPTV Solution for WWC," SA WG2 Meeting #128, S2-187085, Vilnius, Lithuania, Jul. 2-6, 2018, 9 pages.
PCT International Search Report and Written Opinion issued in International Application No. PCT/CN2019/116849 on Jul. 28, 2020, 15 pages (with English translation).
Office Action in Chinese Appln. No. 201980102026.8, dated Dec. 5, 2022, 9 pages.
Extended European Search Report issued in European Application No. 19951541.2 on Sep. 16, 2022, 9 pages.

* cited by examiner

MULTICAST SESSION ESTABLISHMENT METHOD AND NETWORK DEVICE

CROSS-REFERENCE TO RELATED APPLICATIONS

This application is a continuation of International Application No. PCT/CN2019/116849, filed on Nov. 8, 2019, the disclosure of which is hereby incorporated by reference in its entirety.

TECHNICAL FIELD

Embodiments of this application relate to the field of wireless communication technologies, and in particular, to a multicast session establishment method and a network device.

BACKGROUND

A multicast (also referred to as broadcast) technology is a data transmission technology that allows one access point to simultaneously send data to a plurality of stations. As a point-to-multipoint data transmission technology, multicast transmission can improve a network throughput rate and save a network bandwidth. The multicast technology includes multicast service management and multicast session management. The multicast service management is used to manage a receive end, a transmission mode, and the like of the multicast transmission. The multicast session management is used to manage a transmission resource and a multicast bearer.

Conventional multicast transmission is implemented based on a network service architecture shown in FIG. 1. As shown in FIG. 1, a broadcast/multicast service center (BM-SC) and a multimedia broadcast multicast service gateway (MBMS GW) serve as network elements that may be configured to perform multicast session management and multicast service management, and may implement multicast transmission from one transmit end (an application server shown in FIG. 1) to a plurality of receive ends (for example, user equipment (UE) 1, UE 2, UE 3, and UE 4 shown in FIG. 1).

However, when unicast transmission is performed in the conventional network service architecture shown in FIG. 1, the BM-SC and the MBMS GW do not need to participate. As shown in FIG. 1, unicast transmission from the application server to UE 5 and UE 6 is completed via a packet data unit gateway (PDU GW). Therefore, it is unnecessary to deploy the BM-SC and MBMS GW for the unicast transmission. In other words, the BM-SC and MBMS GW purchased by an operator are not fully utilized, but increase complexity of the network architecture.

SUMMARY

Embodiments of this application provide a multicast session establishment method and a network device, to implement establishment of a multicast session based on a network architecture that has been deployed by an operator, so that the network architecture is simplified, and costs are reduced.

To achieve the foregoing objectives, the following technical solutions are used in embodiments of this application:

According to a first aspect, a multicast session establishment method is provided. The method includes: A policy control network element receives a first message from a second network element, where the first message includes information about a multicast session. The policy control network element sends a second message, where the second message includes a policy of the multicast session.

According to the technical solution provided in the first aspect, when the multicast session is established, policy control of the multicast session can be completed via a policy control network element that is in a network architecture that has been deployed by an operator, so as to support a more flexible multicast/broadcast transmission solution. According to the method, the network architecture can be simplified, and costs can be reduced.

With reference to the first aspect, in a first possible implementation, the second network element is a capability exposure network element, a session management network element, or an application server. In this solution, the policy control network element may accept a request of the capability exposure network element to complete a policy decision for the multicast session, or may accept a request of the session management network element or the application server to complete the policy decision for the multicast session. Network elements in a network architecture that has been deployed by an operator cooperate to complete establishment of the multicast session, so that the network architecture can be simplified and implementation is easy.

With reference to the first possible implementation of the first aspect, in a second possible implementation, the second network element is the capability exposure network element. That the policy control network element sends a second message includes: The policy control network element sends the second message to the capability exposure network element. Alternatively, the policy control network element sends the second message to the session management network element. In this solution, if the policy control network element accepts the request of the capability exposure network element to complete the policy decision for the multicast session, the policy control network element may send the determined policy to the capability exposure network element for subsequent multicast session establishment. Alternatively, the policy control network element may send the determined policy to the session management network element for subsequent multicast session establishment. Network elements in a network architecture that has been deployed by an operator cooperate to complete establishment of the multicast session, so that the network architecture can be simplified and implementation is easy.

With reference to the first possible implementation of the first aspect, in a third possible implementation, the second network element is the session management network element. That the policy control network element sends a second message includes: The policy control network element sends the second message to the session management network element. In this solution, if the policy control network element accepts a request of the session management network element to complete a policy decision for the multicast session, the policy control network element may send the determined policy to the session management network element for subsequent multicast session establishment. Network elements in a network architecture that has been deployed by an operator cooperate to complete establishment of the multicast session, so that the network architecture can be simplified and implementation is easy.

With reference to the first possible implementation of the first aspect, in a fourth possible implementation, the second network element is the application server. That the policy control network element sends a second message includes: The policy control network element sends the second message to the session management network element. In this solution, if the policy control network element accepts a request of the application server to complete the policy decision for the multicast session, the policy control network element may send the determined policy to the session management network element for subsequent multicast session establishment. Network elements in a network architecture that has been deployed by an operator cooperate to complete establishment of the multicast session, so that the network architecture can be simplified and implementation is easy.

With reference to the second or the fourth possible implementation of the first aspect, in a fifth possible implementation, the policy control network element sends the second message to the session management network element, and the method further includes: The policy control network element determines the session management network element based on the information about the multicast session and capability information of session management network elements, where the capability information of the session management network element is used to indicate whether the session management network element supports multicast session management. The policy control network element may determine, by considering a capability of each session management network element, a session management network element that can support multicast session management from a plurality of session management network elements before requesting the session management network element to establish the multicast session.

With reference to the second or the fourth possible implementation of the first aspect, in a sixth possible implementation, the first message further includes identification information of the session management network element. The identification information of the session management network element is used to subsequently request to establish the multicast session.

With reference to any one of the first aspect, or the first to the sixth possible implementations of the first aspect, in a seventh possible implementation, the first message is used to request to make a policy decision for the multicast session. The capability exposure network element or the session management network element initiates a request for the policy management network element to make the policy decision. Network elements in a network architecture that has been deployed by an operator cooperate to complete determining of the policy, so that the network architecture is simplified and implementation is easy.

With reference to any one of the first aspect, or the first to the seventh possible implementations of the first aspect, in an eighth possible implementation, the information about the multicast session includes any one or more of the following: quality requirement information, transmission area information, and service identification information that are of the multicast session. In this solution, the policy may be determined based on at least one of the quality requirement information, the transmission area information, and the service identification information that are of the multicast session.

With reference to the eighth possible implementation of the first aspect, in a ninth possible implementation, the service identification information includes an IP address and a port number of the application server. The service identification information is used to identify, during subsequent multicast transmission, multicast data from the application server.

With reference to any one of the first aspect, or the first to the ninth possible implementations of the first aspect, in a tenth possible implementation, the policy includes any one or more of the following: identification information of multicast data and a multicast session quality parameter, where the identification information of the multicast data is used to identify multicast data from the application server. The determined policy may be used to specify quality, receiving, filtering, and the like in subsequent multicast data transmission.

According to a second aspect, a multicast session establishment method is provided. The method includes: A session management network element receives a first message from a capability exposure network element, where the first message includes information about a multicast session. The session management network element obtains a policy of the multicast session.

According to the technical solution provided in the second aspect, when the multicast session is established, policy control of the multicast session can be completed via a policy control network element that is in a network architecture that has been deployed by an operator, so as to support a more flexible multicast/broadcast transmission solution. According to the method, the network architecture can be simplified, and costs can be reduced.

With reference to the second aspect, in a first possible implementation, the information about the multicast session includes any one or more of the following: quality requirement information, transmission area information, and service identification information that are of the multicast session. In this solution, the policy may be determined based on at least one of the quality requirement information, the transmission area information, and the service identification information that are of the multicast session, and implementation is easy.

With reference to the first possible implementation of the second aspect, in a second possible implementation, that the session management network element obtains the policy includes: The session management network element obtains the policy based on a mapping relationship that is between the quality requirement information and the policy and that is configured in the session management network element. In this solution, the policy may be determined based on the quality requirement information of the multicast session, and implementation is easy.

With reference to the first possible implementation of the second aspect, in a third possible implementation, that the session management network element obtains the policy includes: The session management network element obtains the policy based on a mapping relationship that is between the service identification information and the policy and that is configured in the session management network element. In this solution, the policy may be determined based on the service identification information of the multicast session, and implementation is easy.

With reference to any one of the second aspect, or the first to the third possible implementations of the second aspect, in a fourth possible implementation, the first message is used to request to establish the multicast session.

With reference to any one of the second aspect, or the first to the fourth possible implementations of the second aspect, in a fifth possible implementation, the method further includes: The session management network element establishes the multicast session based on the information about the multicast session and the policy. The session management network element in a network architecture that has been deployed by an operator completes establishment of the multicast session, so that the network architecture can be simplified and implementation is easy.

With reference to any one of the first to the fifth possible implementations of the second aspect, in a sixth possible implementation, the service identification information includes an IP address and a port number of the application server. The service identification information is used to identify, during subsequent multicast transmission, multicast data from the application server.

With reference to any one of the second aspect, or the first to the sixth possible implementations of the second aspect, in a seventh possible implementation, the policy includes any one or more of the following: identification information of multicast data and a multicast session quality parameter, where the identification information of the multicast data is used to identify multicast data from the application server. The determined policy may be used to specify quality, receiving, filtering, and the like in subsequent multicast data transmission.

According to a third aspect, a multicast session establishment method is provided. The method includes: A capability exposure network element receives a third message from an application server, where the third message is used to request to establish a multicast session, and the third message includes information about the multicast session. The capability exposure network element sends a first message, where the first message includes the information about the multicast session, and the information about the multicast session is used to generate a policy of the multicast session.

In the technical solution provided in the third aspect, the capability exposure network element may indicate a policy decision based on a request of the application server. Network elements in a network architecture that has been deployed by an operator cooperate to complete the policy decision, so that the network architecture can be simplified and implementation is easy.

With reference to the third aspect, in a first possible implementation, that the capability exposure network element sends a first message includes: The capability exposure network element sends the first message to a policy control network element, where the first message is used to request to make a policy decision for the multicast session. The capability exposure network element may request the policy control network element to make the policy decision. Network elements in a network architecture that has been deployed by an operator cooperate to complete the policy decision, so that the network architecture can be simplified and implementation is easy.

With reference to the first possible implementation of the third aspect, in a second possible implementation, the method further includes: The capability exposure network element determines the policy control network element based on the information about the multicast session and capability information of policy control network elements, where the capability information of the policy control network element is used to indicate whether the policy control network element supports policy management of the multicast session. The capability exposure network element may determine, by considering a capability of each policy control network element, a policy control network element that can support multicast policy management from a plurality of policy control network elements before requesting the policy control network element to make the policy decision.

With reference to the first or the second possible implementation of the third aspect, in a third possible implementation, the method further includes: The capability exposure network element receives a second message from the policy control network element, where the second message includes the policy. The capability exposure network element may further request, according to the determined policy, to establish the multicast session. Network elements in a network architecture that has been deployed by an operator cooperate to complete establishment of the multicast session, so that the network architecture can be simplified and implementation is easy.

With reference to the third possible implementation of the third aspect, in a fourth possible implementation, the method further includes: The capability exposure network element sends a fourth message to the session management network element, where the fourth message includes the information about the multicast session and the policy. Network elements in a network architecture that has been deployed by an operator cooperate to complete establishment of the multicast session, so that the network architecture can be simplified and implementation is easy.

With reference to the fourth possible implementation of the third aspect, in a fifth possible implementation, the fourth message is used to request to establish the multicast session.

With reference to the first or the second possible implementation of the third aspect, in a sixth possible implementation, the first message further includes identification information of the session management network element. The identification information of the session management network element is used to subsequently request to establish the multicast session.

With reference to any one of the fourth to the sixth possible implementations of the third aspect, in a seventh possible implementation, the method further includes: The capability exposure network element determines the session management network element based on the information about the multicast session and capability information of session management network elements. The capability information of the session management network element is used to indicate whether the session management network element supports multicast session management. The capability exposure network element may determine, by considering a capability of each session management network element, a session management network element that can support multicast session management from a plurality of session management network elements before requesting the session management network element to establish the multicast session.

With reference to the third aspect, in an eighth possible implementation, that the capability exposure network element sends a first message includes: The capability exposure network element sends the first message to the session management network element, where the first message is used to request to establish the multicast session.

With reference to the eighth possible implementation of the third aspect, in a ninth possible implementation, the first message further includes identification information of the policy control network element. The identification information of the policy control network element is used for a subsequent policy decision.

With reference to the ninth possible implementation of the third aspect, in a tenth possible implementation, before that the capability exposure network element sends the first message to the session management network element, the method further includes: The capability exposure network element determines the session management network element based on the information about the multicast session and the capability information of session management network elements, where the capability information of the session management network element is used to indicate whether the session management network element supports multicast session management. The capability exposure network element determines the policy control network element based on the information about the multicast session and the capability information of the policy control network element, where the capability information of the policy control network element is used to indicate whether the policy control network element supports policy management of the multicast session. The capability exposure network element may consider a capability of each network element to determine a policy control network element that can support multicast policy management from a plurality of policy control network elements, and determine a session management network element that can support multicast session management from a plurality of session management network elements.

With reference to any one of the third aspect, or the first to the tenth possible implementations of the third aspect, in an eleventh possible implementation, the information about the multicast session includes any one or more of the following: quality requirement information, transmission area information, and service identification information that are of the multicast session. In this solution, the policy may be determined based on at least one of the quality requirement information, the transmission area information, and the service identification information that are of the multicast session.

With reference to the eleventh possible implementation of the third aspect, in a twelfth possible implementation, the service identification information includes an IP address and a port number of the application server. The service identification information is used to identify, during subsequent multicast transmission, multicast data from the application server.

With reference to any one of the third aspect, or the first to the twelfth possible implementations of the third aspect, in a thirteenth possible implementation, the policy includes any one or more of the following: identification information of multicast data and a multicast session quality parameter, where the identification information of the multicast data is used to identify multicast data from the application server. The determined policy may be used to specify quality, receiving, filtering, and the like in subsequent multicast data transmission.

According to a fourth aspect, a multicast session establishment method is provided. The method includes: A session management network element receives a second message from a policy management network element, where the second message includes a policy of a multicast session. The session management network element establishes the multicast session.

In the technical solution provided in the fourth aspect, the session management network element may establish the multicast session based on a request of the policy management network element. Network elements in a network architecture that has been deployed by an operator cooperate to complete establishment of the multicast session, so that the network architecture can be simplified and implementation is easy.

With reference to the fourth aspect, in a first possible implementation, the policy of the multicast session is obtained by the policy management network element through decision. The policy management network element in a network architecture that has been deployed by an operator completes a policy decision, so that the network architecture can be simplified and implementation is easy.

With reference to the fourth aspect or the first possible implementation of the fourth aspect, in a second possible implementation, the second message is used to request to establish the multicast session.

With reference to the fourth aspect, or the first or the second possible implementation of the fourth aspect, in a third possible implementation, the second message further includes transmission area information and service identification information.

With reference to the third possible implementation of the fourth aspect, in a fourth possible implementation, the service identification information includes an IP address and a port number of an application server. The service identification information is used to identify, during subsequent multicast transmission, multicast data from the application server.

With reference to any one of the fourth aspect, or the first to the fourth possible implementations of the fourth aspect, in a fifth possible implementation, the policy includes any one or more of the following: identification information of multicast data and a multicast session quality parameter, where the identification information of the multicast data is used to identify multicast data from the application server. The determined policy may be used to specify quality, receiving, filtering, and the like in subsequent multicast data transmission.

According to a fifth aspect, a multicast session establishment method is provided. The method includes: A session management network element receives a fourth message from a capability exposure network element, where the fourth message includes a policy of a multicast session. The session management network element establishes the multicast session.

In the technical solution provided in the fifth aspect, the session management network element may establish the multicast session based on a request of the capability exposure network element. Network elements in a network architecture that has been deployed by an operator cooperate to complete establishment of the multicast session, so that the network architecture can be simplified and implementation is easy.

With reference to the fifth aspect, in a first possible implementation, the fourth message is used to request to establish the multicast session.

With reference to any one of the fifth aspect and the first possible implementation of the fifth aspect, in a second possible implementation, the fourth message further includes transmission area information and service identification information.

With reference to the second possible implementation of the fifth aspect, in a third possible implementation, the service identification information includes an IP address and a port number of an application server. The service identification information is used to identify, during subsequent multicast transmission, multicast data from the application server.

With reference to any one of the fifth aspect, or the first to the third possible implementations of the fifth aspect, in a fourth possible implementation, the policy includes any one or more of the following: identification information of multicast data and a multicast session quality parameter, where the identification information of the multicast data is used to identify multicast data from the application server. The determined policy may be used to specify quality, receiving, filtering, and the like in subsequent multicast data transmission.

According to a sixth aspect, a policy control network element is provided. The policy control network element includes a receiving unit, configured to receive a first message from a second network element, where the first message includes information about a multicast session; and a sending unit, configured to send a second message, where the second message includes a policy of the multicast session.

According to the technical solution provided in the sixth aspect, when the multicast session is established, policy control of the multicast session can be completed via a policy control network element that is in a network architecture that has been deployed by an operator, so as to support a more flexible multicast/broadcast transmission solution. According to the method, the network architecture can be simplified, and costs can be reduced.

With reference to the sixth aspect, in a first possible implementation, the second network element is a capability exposure network element, a session management network element, or an application server. In this solution, the policy control network element may accept a request of the capability exposure network element to complete a policy decision for the multicast session, or may accept a request of the session management network element or the application server to complete the policy decision for the multicast session. Network elements in a network architecture that has been deployed by an operator cooperate to complete establishment of the multicast session, so that the network architecture can be simplified and implementation is easy.

With reference to the first possible implementation of the sixth aspect, in a second possible implementation, the second network element is the capability exposure network element. That the sending unit sends a second message includes: The sending unit sends the second message to the capability exposure network element. Alternatively, the sending unit sends the second message to the session management network element. In this solution, if the policy control network element accepts the request of the capability exposure network element to complete the policy decision for the multicast session, the policy control network element may send the determined policy to the capability exposure network element for subsequent multicast session establishment. Alternatively, the policy control network element may send the determined policy to the session management network element for subsequent multicast session establishment. Network elements in a network architecture that has been deployed by an operator cooperate to complete establishment of the multicast session, so that the network architecture can be simplified and implementation is easy.

With reference to the first possible implementation of the sixth aspect, in a third possible implementation, the second network element is the session management network element. That the sending unit sends a second message includes: The sending unit sends the second message to the session management network element. In this solution, if the policy control network element accepts a request of the session management network element to complete a policy decision for the multicast session, the policy control network element may send the determined policy to the session management network element for subsequent multicast session establishment. Network elements in a network architecture that has been deployed by an operator cooperate to complete establishment of the multicast session, so that the network architecture can be simplified and implementation is easy.

With reference to the first possible implementation of the sixth aspect, in a fourth possible implementation, the second network element is the application server. That the sending unit sends a second message includes: The sending unit sends the second message to the session management network element. In this solution, if the policy control network element accepts a request of the application server to complete a policy decision for the multicast session, the policy control network element may send the determined policy to the session management network element for subsequent multicast session establishment. Network elements in a network architecture that has been deployed by an operator cooperate to complete establishment of the multicast session, so that the network architecture can be simplified and implementation is easy.

With reference to the second or the fourth possible implementation of the sixth aspect, in a fifth possible implementation, the sending unit sends the second message to the session management network element, and the policy control network element further includes a processing unit, configured to determine the session management network element based on the information about the multicast session and capability information of session management network elements, where the capability information of the session management network element is used to indicate whether the session management network element supports multicast session management. The policy control network element may determine, by considering a capability of each session management network element, a session management network element that can support multicast session management from a plurality of session management network elements before requesting the session management network element to establish the multicast session.

With reference to the second or the fourth possible implementation of the sixth aspect, in a sixth possible implementation, the first message further includes identification information of the session management network element. The identification information of the session management network element is used to subsequently request to establish the multicast session.

With reference to any one of the sixth aspect, or the first to the sixth possible implementations of the sixth aspect, in a seventh possible implementation, the first message is used to request to make a policy decision for the multicast session. The capability exposure network element or the session management network element initiates a request for the policy management network element to make the policy decision. Network elements in a network architecture that has been deployed by an operator cooperate to complete determining of the policy, so that the network architecture is simplified and implementation is easy.

With reference to any one of the sixth aspect, or the first to the seventh possible implementations of the sixth aspect, in an eighth possible implementation, the information about the multicast session includes any one or more of the following: quality requirement information, transmission area information, and service identification information that are of the multicast session. In this solution, the policy may be determined based on at least one of the quality requirement information, the transmission area information, and the service identification information that are of the multicast session.

With reference to the eighth possible implementation of the sixth aspect, in a ninth possible implementation, the service identification information includes an IP address and a port number of the application server. The service identification information is used to identify, during subsequent multicast transmission, multicast data from the application server.

With reference to any one of the sixth aspect, or the first to the ninth possible implementations of the sixth aspect, in a tenth possible implementation, the policy includes any one or more of the following: identification information of multicast data and a multicast session quality parameter, where the identification information of the multicast data is used to identify multicast data from the application server. The determined policy may be used to specify quality, receiving, filtering, and the like in subsequent multicast data transmission.

According to a seventh aspect, a session management network element is provided. The session management network element includes; a receiving unit, configured to receive a first message from a capability exposure network element, where the first message includes information about a multicast session; and a processing unit, configured to obtain a policy of the multicast session.

According to the technical solution provided in the seventh aspect, when the multicast session is established, policy control of the multicast session can be completed via a policy control network element that is in a network architecture that has been deployed by an operator, so as to support a more flexible multicast/broadcast transmission solution. According to the method, the network architecture can be simplified, and costs can be reduced.

With reference to the seventh aspect, in a first possible implementation, the information about the multicast session includes any one or more of the following: quality requirement information, transmission area information, and service identification information that are of the multicast session. In this solution, the policy may be determined based on at least one of the quality requirement information, the transmission area information, and the service identification information that are of the multicast session, and implementation is easy.

With reference to the first possible implementation of the seventh aspect, in a second possible implementation, that the processing unit obtains the policy includes: The processing unit obtains the policy based on a mapping relationship that is between quality requirement information and a policy and that is configured in the session management network element. In this solution, the policy may be determined based on the quality requirement information of the multicast session, and implementation is easy.

With reference to the first possible implementation of the seventh aspect, in a third possible implementation, that the processing unit obtains a policy includes: The processing unit obtains the policy based on a mapping relationship that is between the service identification information and the policy and that is configured in the session management network element. In this solution, the policy may be determined based on the service identification information of the multicast session, and implementation is easy.

With reference to any one of the seventh aspect, or the first to the third possible implementations of the seventh aspect, in a fourth possible implementation, the first message is used to request to establish the multicast session.

With reference to any one of the seventh aspect, or the first to the fourth possible implementations of the seventh aspect, in a fifth possible implementation, the processing unit is further configured to establish the multicast session based on the information about the multicast session and the policy. The session management network element in a network architecture that has been deployed by an operator completes establishment of the multicast session, so that the network architecture can be simplified and implementation is easy.

With reference to any one of the first to the fifth possible implementations of the seventh aspect, in a sixth possible implementation, the service identification information includes an IP address and a port number of the application server. The service identification information is used to identify, during subsequent multicast transmission, multicast data from the application server.

With reference to any one of the seventh aspect, or the first to the sixth possible implementations of the seventh aspect, in a seventh possible implementation, the policy includes any one or more of the following: identification information of multicast data and a multicast session quality parameter, where the identification information of the multicast data is used to identify multicast data from the application server. The determined policy may be used to specify quality, receiving, filtering, and the like in subsequent multicast data transmission.

According to an eighth aspect, a capability exposure network element is provided. The capability exposure network element includes: a receiving unit, configured to receive a third message from an application server, where the third message is used to request to establish a multicast session, and the third message includes information about the multicast session; and a sending unit, configured to send a first message, where the first message includes the information about the multicast session, and the information about the multicast session is used to generate a policy of the multicast session.

In the technical solution provided in the eighth aspect, the capability exposure network element may indicate a policy decision based on a request of the application server. Network elements in a network architecture that has been deployed by an operator cooperate to complete the policy decision, so that the network architecture can be simplified and implementation is easy.

With reference to the eighth aspect, in a first possible implementation, that the sending unit sends a first message includes: The sending unit sends the first message to a policy control network element, where the first message is used to request to make a policy decision for the multicast session. The capability exposure network element may request the policy control network element to make the policy decision. Network elements in a network architecture that has been deployed by an operator cooperate to complete the policy decision, so that the network architecture can be simplified and implementation is easy.

With reference to the first possible implementation of the eighth aspect, in a second possible implementation, the capability exposure network element further includes a processing unit, configured to determine the policy control network element based on the information about the multicast session and capability information of policy control network elements, where the capability information of the policy control network element is used to indicate whether the policy control network element supports policy management of the multicast session. The capability exposure network element may determine, by considering a capability of each policy control network element, a policy control network element that can support multicast policy management from a plurality of policy control network elements before requesting the policy control network element to make the policy decision.

With reference to the first or the second possible implementation of the eighth aspect, in a third possible implementation, the receiving unit is further configured to receive a second message from the policy control network element, where the second message includes the policy. The capability exposure network element may further request, according to the determined policy, to establish the multicast session. Network elements in a network architecture that has been deployed by an operator cooperate to complete establishment of the multicast session, so that the network architecture can be simplified and implementation is easy.

With reference to the third possible implementation of the eighth aspect, in a fourth possible implementation, the sending unit is further configured to send a fourth message to a session management network element, where the fourth message includes the information about the multicast session and the policy. Network elements in a network architecture that has been deployed by an operator cooperate to complete establishment of the multicast session, so that the network architecture can be simplified and implementation is easy.

With reference to the fourth possible implementation of the eighth aspect, in a fifth possible implementation, the fourth message is used to request to establish the multicast session.

With reference to the first or the second possible implementation of the eighth aspect, in a sixth possible implementation, the first message further includes identification information of the session management network element. The identification information of the session management network element is used to subsequently request to establish the multicast session.

With reference to the first possible implementation of the eighth aspect, in a seventh possible implementation, the processing unit is further configured to determine the session management network element based on the information about the multicast session and capability information of session management network elements, where the capability information of the session management network element is used to indicate whether the session management network element supports multicast session management. The capability exposure network element may determine, by considering a capability of each session management network element, a session management network element that can support multicast session management from a plurality of session management network elements before requesting the session management network element to establish the multicast session.

With reference to the eighth aspect, in an eighth possible implementation, that the sending unit sends a first message includes: The sending unit sends the first message to the session management network element, where the first message is used to request to establish the multicast session.

With reference to the eighth possible implementation of the eighth aspect, in a ninth possible implementation, the first message further includes identification information of the policy control network element. The identification information of the policy control network element is used for a subsequent policy decision.

With reference to the ninth possible implementation of the eighth aspect, in a tenth possible implementation, before the sending unit sends the first message to the session management network element, the processing unit is further configured to: determine the session management network element based on the information about the multicast session and capability information of session management network elements, where the capability information of the session management network element is used to indicate whether the session management network element supports multicast session management; and determine the policy control network element based on the information about the multicast session and the capability information of the policy control network element, where the capability information of the policy control network element is used to indicate whether the policy control network element supports policy management of the multicast session. The capability exposure network element may consider a capability of each network element to determine a policy control network element that can support multicast policy management from a plurality of policy control network elements, and determine a session management network element that can support multicast session management from a plurality of session management network elements.

With reference to any one of the eighth aspect, or the first to the tenth possible implementations of the eighth aspect, in an eleventh possible implementation, the information about the multicast session includes any one or more of the following: quality requirement information, transmission area information, and service identification information that are of the multicast session. In this solution, the policy may be determined based on at least one of the quality requirement information, the transmission area information, and the service identification information that are of the multicast session.

With reference to the eleventh possible implementation of the eighth aspect, in a twelfth possible implementation, the service identification information includes an IP address and a port number of the application server. The service identification information is used to identify, during subsequent multicast transmission, multicast data from the application server.

With reference to any one of the eighth aspect, or the first to the twelfth possible implementations of the eighth aspect, in a thirteenth possible implementation, the policy includes any one or more of the following: identification information of multicast data and a multicast session quality parameter, where the identification information of the multicast data is used to identify multicast data from the application server. The determined policy may be used to specify quality, receiving, filtering, and the like in subsequent multicast data transmission.

According to a ninth aspect, a policy control network element is provided. The policy control network element includes: a memory, configured to store computer program code, where the computer program code includes instructions; a radio frequency circuit, configured to send and receive a radio signal; and a processor, configured to execute the foregoing instructions, so that the policy control network element performs the multicast session establishment method according to any one of the possible implementations of the first aspect.

According to a tenth aspect, a session management network element is provided. The session management network element includes: a memory, configured to store computer program code, where the computer program code includes instructions; a radio frequency circuit, configured to send and receive a radio signal; and a processor, configured to execute the foregoing instructions, so that the session management network element performs the multicast session establishment method according to any one of the possible implementations of the second aspect, the fourth aspect, or the fifth aspect.

According to an eleventh aspect, a capability exposure network element is provided. The capability exposure network element includes: a memory, configured to store computer program code, where the computer program code includes instructions; a radio frequency circuit, configured to send and receive a radio signal, and a processor, configured to execute the foregoing instructions, so that the capability exposure network element performs the multicast session establishment method according to any one of the possible implementations of the third aspect.

According to a twelfth aspect, a computer-readable storage medium is provided. The computer-readable storage medium stores computer-executable instructions. When the computer-executable instructions are executed by a processor, the multicast session establishment method according to any one of the possible implementations of the first aspect, the second aspect, the third aspect, the fourth aspect, or the fifth aspect is implemented.

According to a thirteenth aspect, a chip system is provided. The chip system includes a processor and a memory. The memory stores instructions. When the instructions are executed by the processor, the multicast session establishment method according to any one of the possible implementations of the first aspect, the second aspect, the third aspect, the fourth aspect, or the fifth aspect is implemented. The chip system may include a chip, or include a chip and another discrete device.

According to a fourteenth aspect, a computer program product is provided. When the computer program product runs on a computer, the multicast session establishment method according to any one of the possible implementations of the first aspect, the second aspect, the third aspect, the fourth aspect, or the fifth aspect is implemented. For example, the computer may be at least one storage node.

According to a fifteenth aspect, a communication system is provided. The communication system includes any plurality of network elements according to the sixth aspect to the eighth aspect.

According to a sixteenth aspect, a communication system is provided. The communication system includes any plurality of network elements according to the ninth aspect to the eleventh aspect.

DESCRIPTION OF EMBODIMENTS

Embodiments of this application provide a multicast session establishment method. The method is used to establish a multicast session between an application function (AF) (such as an application server) and a plurality of user equipments (UEs). The established multicast session is used by the AF to simultaneously send multicast data (for example, an application system message) to a specific area. It should be noted that in the following descriptions, related terms such as "multicast/broadcast", "groupcast". "group communication", and "broadcast" are interchangeable.

The multicast session establishment method provided in embodiments of this application is applicable to a network service architecture that has been deployed by an operator, for example, a network service architecture that is based on a new radio (NR) network in a 5th generation (5G) mobile communication system and that has been deployed by an operator, or a network service architecture that is based on a long term evolution (LTE) network in a 4th generation (4G) mobile communication system and that has been deployed by an operator, to complete transmission of the multicast data, and may alternatively be applied to another network service architecture, for example, another mobile communication system developed after the 5th generation. This is not limited in embodiments of this application. According to the multicast session establishment method provided in embodiments of this application, policy control of the multicast session can be implemented, so that a more flexible multicast/broadcast transmission solution is supported. In addition, the network architecture can be simplified, network overheads can be reduced, and costs of the operator can be reduced.

It should be noted that the multicast session establishment method provided in embodiments of this application is also applicable to a broadcast session, a multicast/broadcast session, a multicast broadcast service session (MBS Session), or a groupcast session. In embodiments of this application, a multicast session establishment process is used as an example for detailed descriptions.

Figure 1:
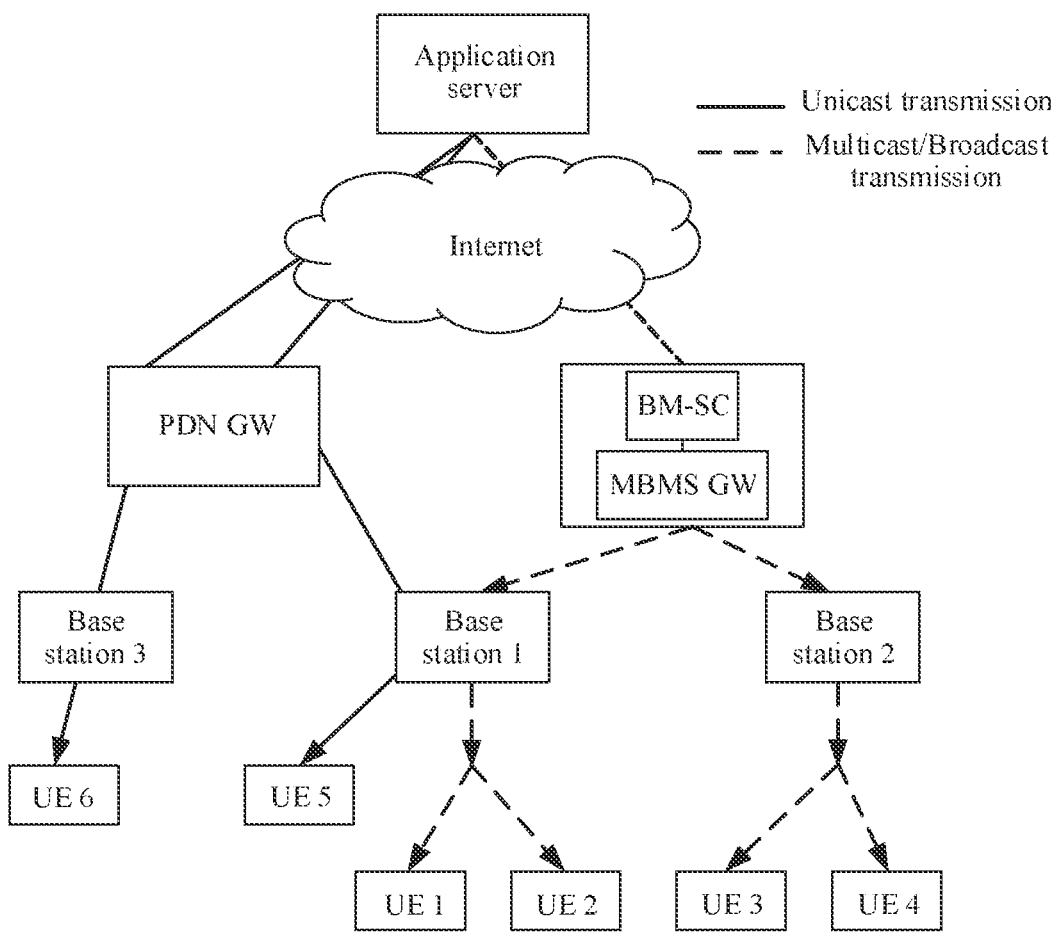
FIG. 1 is a schematic diagram of an example of a conventional network service architecture according to an embodiment of this application.
Figure 2:
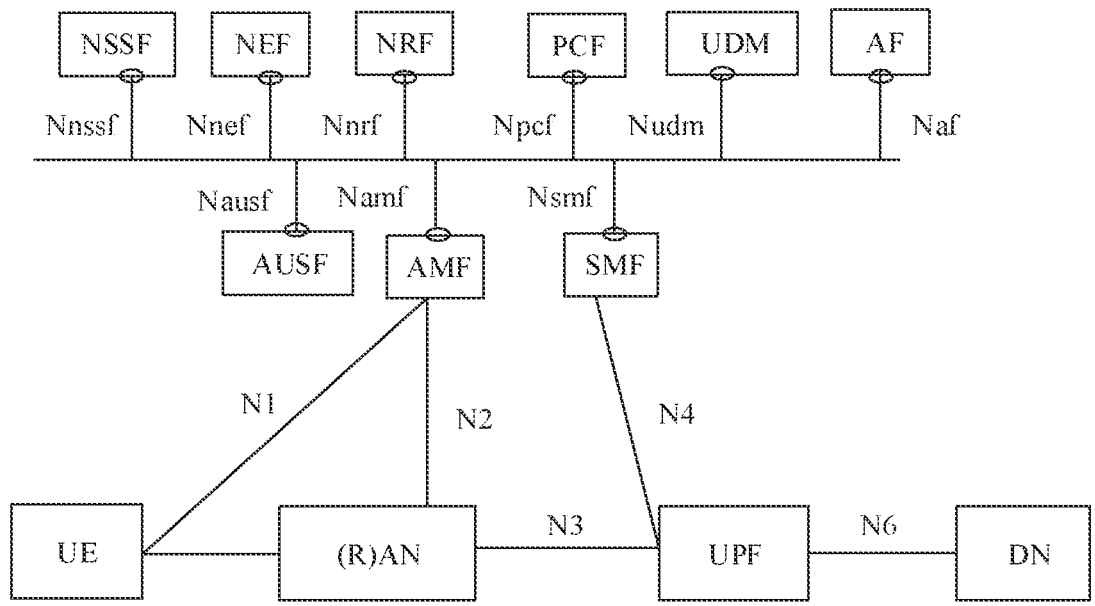
FIG. 2 is a schematic diagram of an example of a network service architecture according to an embodiment of this application.

FIG. 2 shows a network service architecture, and interaction relationships and corresponding interfaces between network functions and entities in the network service architecture by using a network service architecture of an NR network in a 5G mobile communication system as an example. As shown in FIG. 2, network functions and entities included in a 3GPP service-based network architecture (SBA) of a 5G system mainly include UE, an access network (AN) or a radio access network (RAN), a user plane function (UPF), a data network (DN), an access management function (AMF), a session management function (SMF), an authentication service function (AUSF), a policy control function (PCF), an application function AF, a network slice selection function (NSSF), a unified data management (UDM), a network exposure function (NEF) (also referred to as a capability exposure network element), and a network repository function (NRF).

The UE, the (R)AN, the UPF, and the DN are usually referred to as user plane network functions and entities (or user plane network elements), and the other parts are usually referred to as control plane network functions and entities (or control plane network elements). A processing function of the control plane network element in a network is defined by 3GPP. The control plane network element has a function behavior defined by 3GPP and an interface defined by 3GPP. The network function can be used as a network element running on dedicated hardware, a software instance running on dedicated hardware, or a virtual function that is instantiated on a proper platform, for example, implemented on a cloud infrastructure device.

The following describes main functions of each network element in detail.

A (R)AN may be an AN or a RAN. Specifically, the (R)AN may be base stations in various forms, for example, a macro base station, a micro base station, and a distributed unit-control unit (DU-CU). The DU-CU is a device that is deployed in a radio access network and that can perform wireless communication with UE. In addition, the base station may alternatively be a radio controller in a cloud radio access network (CRAN) scenario, or may be a relay station, an access point, a vehicle-mounted device, a wearable device, a network device in a future evolved public land mobile network (PLMN) network, or the like. The (R)AN is mainly responsible for radio resource management, service quality management, data compression and encryption, and the like on an air interface side. It should be noted that, in systems using different radio access technologies, names of devices having a base station function may be different. For example, the base station may be an evolved NodeB (eNB or e-NodeB) in a long term evolution (LTE) technology, or may be a gNB in a 5G system.

A UPF is mainly responsible for packet routing and forwarding, quality of service (QoS) processing of user plane data, and the like. The UPF may receive downlink data from an AF, and then transmit the downlink data to UE via a (R)AN.

A DN is a network used to transmit data. For example, the DN may be an operator service network, an internet access network, or a third-party service network. The DN may exchange information with UE by using a PDU session. PDU sessions may be classified into a plurality of types, for example, internet protocol version 4 (IPv4) and IPv6.

An AMF is mainly responsible for processing a control plane message, for example, access control, mobility management, lawful interception, and access authentication/authorization.

An SMF is mainly used for session management, internet protocol (IP) address allocation and management of UE, selection of a manageable user plane function, termination of a policy control and charging function interface, downlink data notification, and the like.

An AUSF is mainly responsible for network security, and is configured to: generate a key, implement bidirectional authentication for UE, and the like.

A PCF is mainly configured to: provide parameters related to a UE policy rule, an AM policy rule, and an SM policy rule for UE, an AMF, or an SMF, respectively, manage user subscription information, and the like. In a V2X scenario, the PCF provides information such as V2X-related authentication and policy parameters for the UE and an NG-RAN.

A UDM is mainly used for authentication credit processing, subscriber identifier processing, access authorization, registration/mobility management, subscription management, and SMS message management.

An NEF is used by an operator network to open up data in the network to a third-party application server or receive data provided by a third-party application server for the network.

An NRF is mainly configured to: provide an internal/external addressing function, receive a query request of another network element for a type of network element, and return information about the related network element.

An AF is configured to provide an application service (also referred to as a service) for a user, and has a function similar to that of a service capability server (SCS)/an application server (AS). The AF may provide description information of the service or the application service, or may provide to-be-transmitted data. In this application, an AF network element may be an application server deployed by an operator, or may be an application server deployed by a third party.

The UE and the (R)AN shown in FIG. 2 may communicate with each other by using an air interface technology. As shown in FIG. 2, N1 is a reference point between the UE and the AMF. N2 is a reference point between the (R)AN and the AMF, and N2 may be used to send a non-access stratum (NAS) message and the like. N3 is a reference point between the (R)AN and the UPF, and N3 is used to transmit user plane data and the like. N4 is a reference point between the SMF and the UPF. N6 is a reference point between the UPF and the DN. In FIG. 2, Namf is a service-based interface provided by the AMF, Nsmf is a service-based interface provided by the SMF, and Nausf is a service-based interface provided by the AUSF. Nnssf is a service-based interface provided by the NSSF. Nnef is a service-based interface provided by the NEF. Nnrf is a service-based interface provided by the NRF. Npcf is a service-based interface provided by the PCF. Nudm is a service-based interface provided by the UDM. Naf is a service-based interface provided by the AF.

It should be noted that only functions of the network elements in the network service architecture shown in FIG. 2 are briefly described in embodiments of this application. The functions of the network elements may be adjusted based on an actual use scenario. This is not specifically limited in embodiments of this application. For the functions and working principles of the network elements in the network service architecture shown in FIG. 2, refer to related descriptions in a conventional technology. Details are not described herein again.

In embodiments of this application, the user equipment may be a netbook, a tablet computer, a smartwatch, or the like. Alternatively, the user equipment may be another desktop device, a laptop device, a handheld device, a wearable device, a smart home device, or a vehicle-mounted device that has a radio communication function, for example, an ultra-mobile personal computer (UMPC), a smart camera, a netbook, a personal digital assistant (PDA), a portable multimedia player (PMP), an augmented reality (AR)/a virtual reality (VR) device, a flight vehicle, or a robot. A specific type, structure, and the like of the user equipment are not limited in embodiments of this application.

Figure 3:
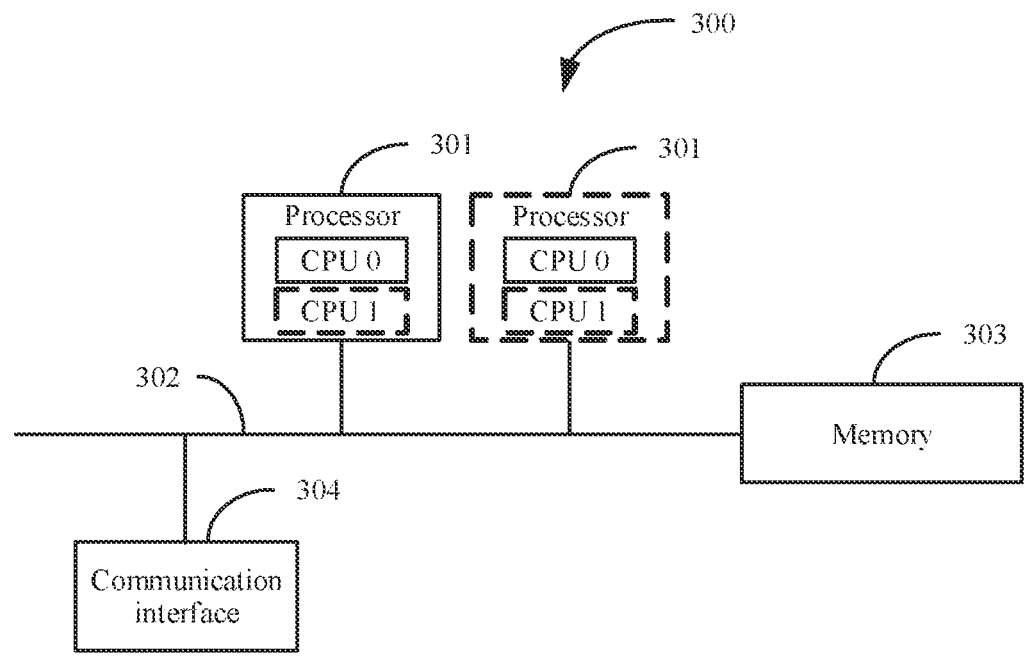
FIG. 3 is a schematic diagram of a structure of UE according to an embodiment of this application.

FIG. 3 is a schematic diagram of a hardware structure of user equipment 300 according to an embodiment of this application. As shown in FIG. 3, the user equipment 300 may include a processor 301, a communication line 302, a memory 303, and at least one communication interface (where FIG. 3 is described merely by using an example in which the communication interface 304 is included).

The processor 301 may be a general-purpose central processing unit (CPU), a microprocessor, an application-specific integrated circuit (ASIC), or one or more integrated circuits configured to control program execution of the solutions in this application.

The communication line 302 may include a path for transmitting information between the foregoing components.

The communication interface 304 is configured to communicate with another device or a communication network such as an Ethernet, a radio access network RAN, or a wireless local area network (WLAN) via any apparatus such as a transceiver.

The memory 303 may be a read-only memory (ROM) or another type of static storage device that can store static information and instructions, a random access memory (RAM) or another type of dynamic storage device that can store information and instructions, or may be an electrically erasable programmable read-only memory (EEPROM), a compact disc read-only memory (CD-ROM) or another optical disc storage, an optical disc storage (including a compressed optical disc, a laser disc, an optical disc, a digital versatile disc, a Blu-ray disc, and the like), a magnetic disk storage medium or another magnetic storage device, or any other medium that can be configured to carry or store expected program code in a form of instructions or a data structure and that can be accessed by a computer, but is not limited thereto. The memory may exist independently, and is connected to the processor through the communication line 302. Alternatively, the memory may be integrated with the processor.

The memory 303 is configured to store computer-executable instructions for executing the solutions of this application. The memory 303 may store the instructions, and the processor 301 controls execution of the instructions. The processor 301 is configured to execute the computer-executable instructions stored in the memory 303, to implement receiving of multicast data. The memory 303 shown in FIG. 3 is merely a schematic diagram. The memory may further include other functional instructions. This is not limited in the present invention.

Optionally, the computer-executable instructions in this embodiment of this application may also be referred to as application program code. This is not specifically limited in this embodiment of this application.

In specific implementation, in an embodiment, the processor 301 may include one or more CPUs, such as a CPU 0 and a CPU 1 in FIG. 3.

A basic principle of a multicast session establishment method provided in embodiments of this application is as follows: Functions of some network elements in a network service architecture (such as the network service architecture shown in FIG. 2) that has been deployed by an operator are expanded, so that the network elements have a function of establishing a multicast session.

Figure 4:
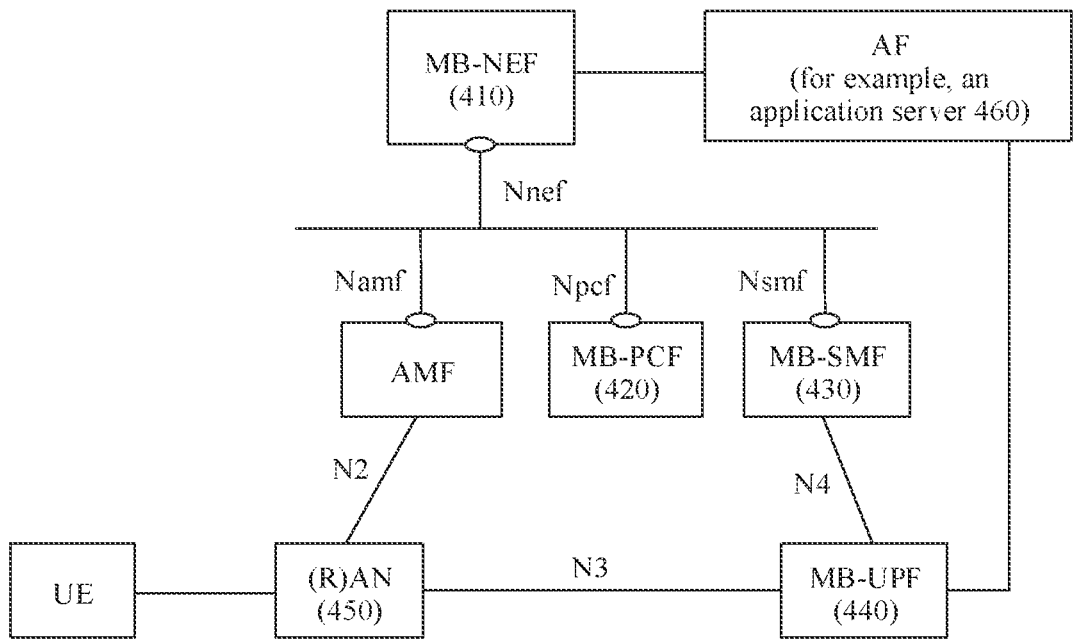
FIG. 4 is an example schematic diagram of a network architecture that is used for multicast/broadcast transmission and in which function expansion has been performed according to an embodiment of this application.

For example, in this embodiment of this application, functions of the NEF network element, the SMF network element, the PCF network element, and the UPF network element in the network service architecture shown in FIG. 2 are expanded. FIG. 4 is an example schematic diagram of a network architecture that is used for multicast transmission and in which function expansion has been performed according to an embodiment of this application. For ease of distinguishing from the network elements shown in FIG. 2, as shown in FIG. 4, an NEF network element, an SMF network element, a PCF network element, and a UPF network element on which function expansion has been performed are represented by an MB-NEF 410, an MB-PCF 420, an MB-SMF 430, and an MB-UPF 440. As shown in FIG. 4, the network architecture that is used for multicast transmission and in which function expansion has been performed further includes a RAN 450, an AF (for example, an application server 460), an AMF, and UE.

For conventional functions of an MB-NEF, an MB-SMF, an MB-PCF, an MB-UPF, an AMF, a RAN, an AF and UE, refer to the foregoing descriptions of the network service architecture shown in FIG. 2. There are different solutions for specific function expansion of the MB-NEF, the MB-SMF, the MB-PCF, and the MB-UPF network elements. A specific function expansion is described in detail in the following different embodiments.

It may be understood that, based on a network service architecture in which function expansion has been performed, multicast transmission may be completed according to the multicast session establishment method provided in embodiments of this application and by using a function provided by at least one of the MB-NEF, MB-SMF, MB-PCF, or MB-UPF network element obtained by performing expansion. Unicast transmission may be performed by using a conventional technology and conventional functions of network elements. For the conventional technology for performing unicast transmission, details are not described in this embodiment of this application.

The multicast session establishment method provided in embodiments of this application may be used to establish a multicast session from the AF (for example, an application server) shown in FIG. 4 to a specific area. The established multicast session is used by the AF to simultaneously send multicast data to the specific area. The UE may have a structure the same as or similar to that shown in FIG. 3.

An example in which the AF is the application server is used below to describe the multicast session establishment method provided in embodiments of this application. For another type of AF, refer to the multicast session establishment method provided in embodiments of this application.

It may be understood that an important part of establishing the multicast session is policy generation of the multicast session. In embodiments of this application, a policy may be obtained by a policy control network element, or may be obtained by a session management network element.

(1) The policy control network element makes a policy decision (for example, a PCF makes a PCC decision).

The policy control network element has a function of policy management of the multicast session. For example, the policy control network element has a function of creating a policy. The policy management of the multicast session further includes but is not limited to one or more of policy and charging control (PCC), managing a QoS parameter of the multicast session, or managing a quality of service flow (QoS Flow) generation rule.

Figure 5:
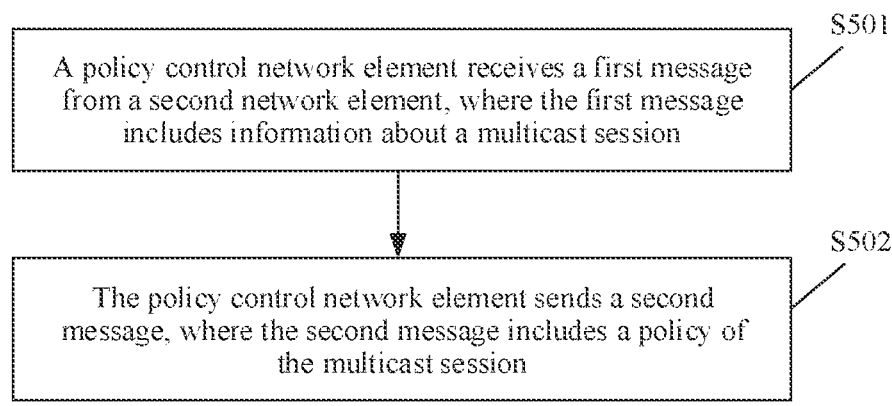
FIG. 5 is a flowchart 1 of a multicast session establishment method according to an embodiment of this application.

FIG. 5 is a flowchart 1 of a multicast session establishment method according to an embodiment of this application. As shown in FIG. 5, the multicast session establishment method provided in this embodiment of this application may include the following steps.

S501: A policy control network element receives a first message from a second network element. The first message includes information about a multicast session.

The policy control network element may be the MB-PCF 420 shown in FIG. 4, or may be a policy control module used for a multicast/broadcast/groupcast management network element. A specific form and structure of the policy control network element are not limited in this embodiment of this application.

The first message is used to request to create a policy for the multicast session. (In other words, the first message is used to request to make a policy decision for the multicast session. It should be noted that creating the policy in this application may be replaced with making the policy decision. This is not limited herein.) The policy is used to specify, but not limited to, one or more of a rule for establishing a QoS flow, an authorized QoS rule, a rule for identifying multicast data, or a rule for filtering multicast data. The rule for establishing the QoS flow includes an authorized QoS parameter of the multicast data. The authorized QoS parameter includes but is not limited to preemption priority information, bit rate information, and the like. The authorized QoS parameter is used to specify transmission quality of the multicast data. The rule for identifying the multicast data is used to identify downlink multicast data. The rule for filtering the multicast data is used to transmit downlink multicast data by using a corresponding resource of a network.

In this embodiment of this application, the information about the multicast session includes any one or more of the following: quality requirement information, transmission area information, and service identification information that are of the multicast session. The quality requirement information of the multicast session is used to represent a quality requirement of an application server 460 on the multicast session. The transmission area information is used to represent a target area in multicast transmission. For example, the transmission area information may include an ID of at least one cell and the like. The service identification information is used to identify multicast data from the application server 460 in a multicast transmission process.

In this embodiment of this application, the quality requirement information of the multicast session may include but is not limited to one or more of a delay requirement, a transmission rate requirement, or a bandwidth requirement of the application server 460 on the multicast session. Optionally, the delay requirement, the transmission rate requirement, or the bandwidth requirement of the application server 460 on the multicast session may be further included in the quality requirement information of the multicast session in a form of an index. For example, the quality requirement information of the multicast session may include quality requirement index information. For example, the quality requirement index information may be 5QI information. The 5QI information is a scalar, and is used as a reference for a specific QoS forwarding behavior (for example, a packet loss rate and a packet delay budget) of a 5G QoS flow. For example, when a value of a standardized 5QI is 1, a maximum packet loss rate corresponding to the standardized 5QI is $10^{-2}$, and a packet delay budget corresponding to the standardized 5QI is 100 ms.

The transmission area information is a target transmission area of the multicast data. For example, the transmission area information may include cell identification information (for example, an ID of a cell), tracking area identification information, or area identification information defined through broadcast. For example, the transmission area information may include a multicast broadcast service area.

In this embodiment of this application, the second network element may be a capability exposure network element. The policy control network element may create the policy for the multicast session based on a request/an indication of the capability exposure network element. The capability exposure network element may be the MB-NEF 410 shown in FIG. 4, or may be a capability exposure module used for a multicast/broadcast/groupcast management network element. A specific form and structure of the capability exposure network element are not limited in this embodiment of this application.

Optionally, the second network element may be a session management network element. The policy control network element may create the policy for the multicast session based on a request/an indication of the session management network element. The session management network element may be the MB-SMF 430 shown in FIG. 4, or may be a session management module used for the multicast/broadcast/groupcast management network element. A specific form and structure of the session management network element are not limited in this embodiment of this application.

Optionally, the second network element may be an application server. The policy control network element may create the policy for the multicast session based on a request/an indication of the application server.

In this embodiment of this application, the application server 460 may send the service identification information to the capability exposure network element (such as the MB-NEF 410) by including service data flow (SDF) template information in a first request message. For example, the SDF template information may include an IP address and a port number of the application server 460.

S502: The policy control network element sends a second message. The second message includes the policy of the multicast session.

The policy may include any one or more of the following; identification information of the multicast data and a multicast session quality parameter (namely, an authorized QoS parameter of the multicast data). The identification information of the multicast data is used to identify multicast data from the application server. The multicast session quality parameter is used to specify transmission quality, for example, a transmission delay, a transmission rate, and a bandwidth, of the multicast data. A multicast data filtering parameter is used to specify a receiving parameter of the multicast data.

In an example, the policy is a PCC rule.

Figure 6:
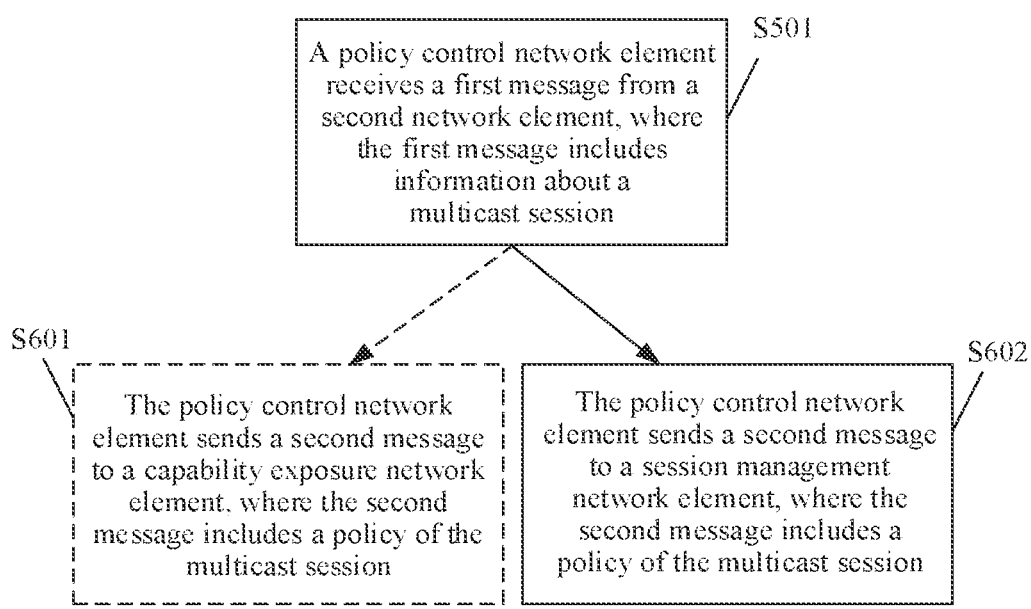
FIG. 6 is a flowchart 2 of a multicast session establishment method according to an embodiment of this application.

When the second network element is the capability exposure network element (for example, the MB-NEF 410), as shown in FIG. 6. S502 in FIG. 5 may be replaced with S601 or S602.

S601: The policy control network element sends the second message to the capability exposure network element. The second message includes the policy of the multicast session.

S602: The policy control network element sends the second message to the session management network element. The second message includes the policy of the multicast session.

Figure 7:
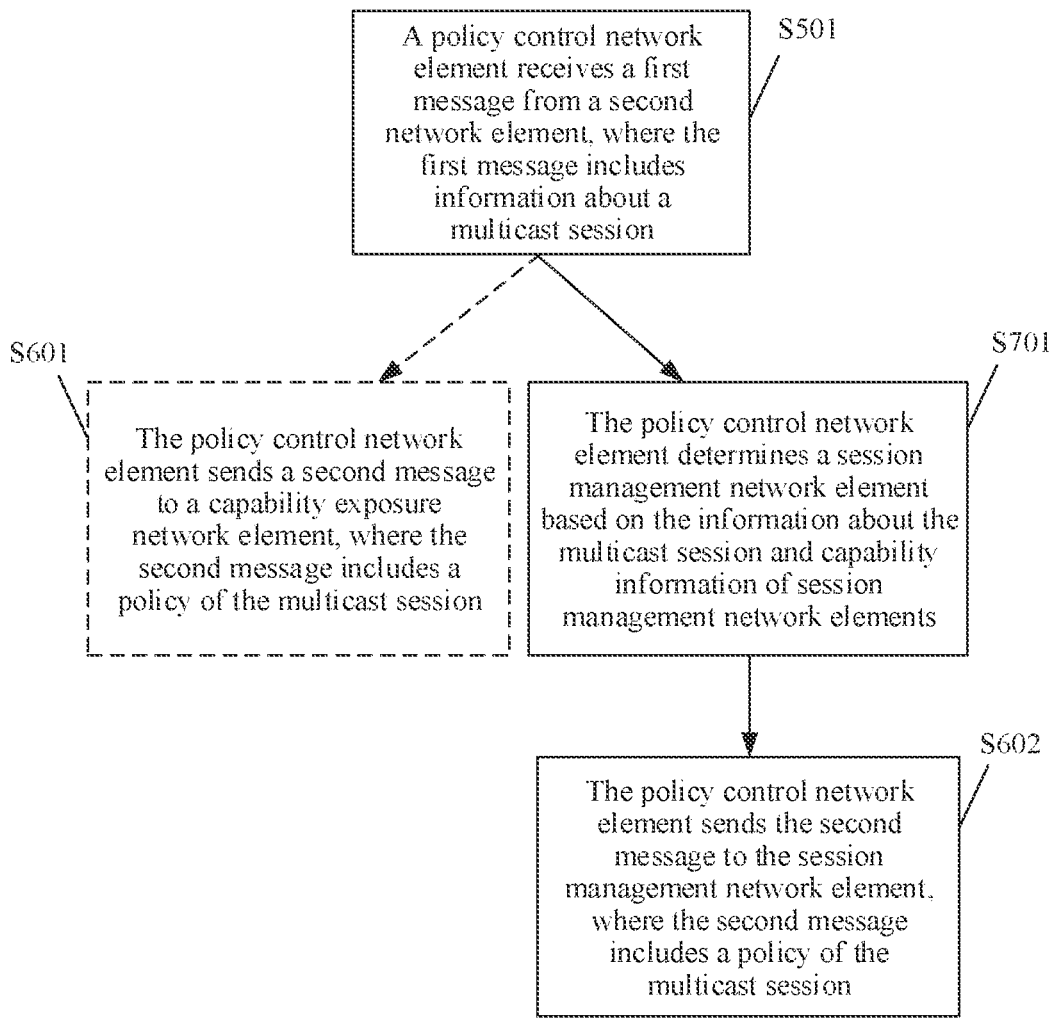
FIG. 7 is a flowchart 3 of a multicast session establishment method according to an embodiment of this application.

Further, when the second network element is the capability exposure network element (for example, the MB-NEF 410), optionally, as shown in FIG. 7, before the policy control network element sends the second message to the session management network element (that is, S602), the multicast session establishment method provided in this embodiment of this application may further include the following steps.

S701: The policy control network element determines the session management network element based on the information about the multicast session and capability information of session management network elements.

The capability information of the session management network element is used to indicate whether the session management network element supports multicast session management.

In this embodiment of this application, the capability exposure network element (such as the MB-NEF 410) may determine, based on the transmission area information and capability information of a plurality of session management network elements in the transmission area indicated by the transmission area information, a network element (such as the MB-SMF 430) used for multicast session management.

It may be understood that a plurality of session management network elements are usually deployed in a core network. Capabilities of the plurality of session management network elements are different. For example, a part of the plurality of session management network elements supports multicast session management, and a part of the plurality of session management network elements does not support multicast session management. The capability exposure network element (for example, the MB-NEF 410) may determine, based on the transmission area information and the capability information of the session management network elements, a session management network element (for example, the MB-SMF 430) configured to perform multicast session management (for example, multicast session establishment). The capability information of the session management network element is used to indicate whether the session management network element supports multicast session management, for example, whether an SMF is an MB-SMF on which function expansion has been performed.

Figure 8:
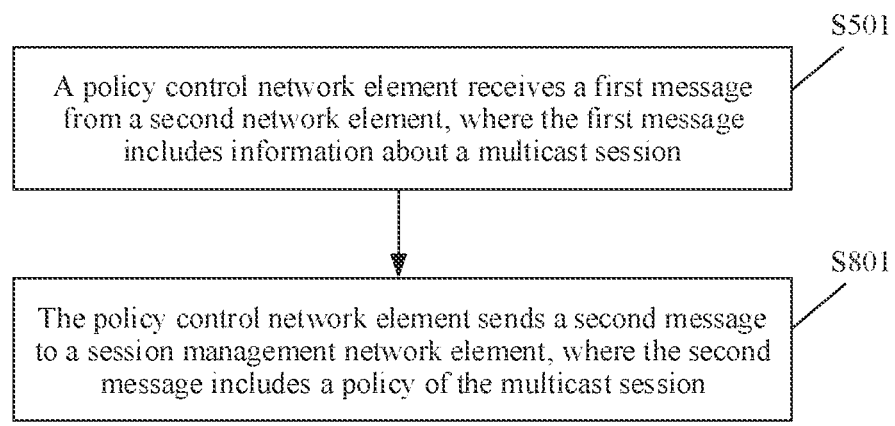
FIG. 8 is a flowchart 4 of a multicast session establishment method according to an embodiment of this application.

When the second network element is the session management network element (such as the MB-SMF 430) or the application server, as shown in FIG. 8, S502 in FIG. 5 may be replaced with S801.

S801: The policy control network element sends the second message to the session management network element. The second message includes the policy of the multicast session.

Further, before S502, the multicast session establishment method provided in this embodiment of this application may further include: The policy control network element creates the policy for the multicast session based on the information about the multicast session.

The policy may include any one or more of the following: the identification information of the multicast data, the multicast session quality parameter, or the multicast data filtering parameter.

In this embodiment of this application, the policy control network element may create the policy for the multicast session based on information such as the quality requirement information and the service identification information that are of the multicast session.

Optionally, the policy control network element may create the policy for the multicast session based only on the service identification information.

(2) The session management network element obtains the policy of the multicast session.

The session management network element has a function of determining a policy.

Figure 9:
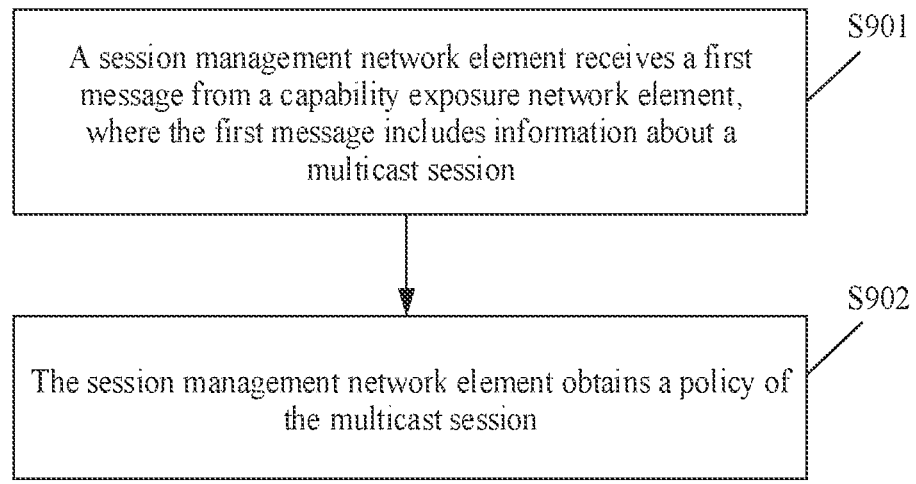
FIG. 9 is a flowchart 5 of a multicast session establishment method according to an embodiment of this application.

As shown in FIG. 9, a multicast session establishment method provided in an embodiment of this application may include the following steps.

S901: A session management network element receives a first message from a capability exposure network element. The first message includes information about a multicast session.

The session management network element may be the MB-SMF 430 shown in FIG. 4, and the capability exposure network element may be the MB-NEF 410 shown in FIG. 4. The first message is used to request to obtain a policy created for the multicast session. The policy is used to specify, but not limited to, one or more of a rule for establishing a QoS flow, an authorized QoS rule, a rule for identifying multicast data, or a rule for filtering multicast data. For related descriptions of the policy, refer to the descriptions in S502. Details are not described herein again.

In this embodiment of this application, the information about the multicast session includes any one or more of the following: quality requirement information, transmission area information, and service identification information that are of the multicast session. For example, the service identification information may include an IP address and a port number of an application server.

S902: The session management network element obtains the policy of the multicast session.

The policy may include any one or more of the following: identification information of the multicast data, a multicast session quality parameter, or a multicast data filtering parameter. The identification information of the multicast data is used to identify multicast data from an application server 460. The multicast session quality parameter is used to specify transmission quality, for example, a transmission delay, a transmission rate, and a bandwidth, of the multicast data. A multicast data filtering parameter is used to specify a receiving parameter of the multicast data.

In this embodiment of this application, a mapping relationship between quality requirement information and a policy may be preconfigured in the session management network element (for example, the MB-SMF 430). The session management network element may obtain the policy of the multicast session based on the mapping relationship that is between quality requirement information and a policy and that is configured in the session management network element.

Optionally, a mapping relationship between service identification information and a policy may be alternatively preconfigured in the session management network element (for example, the MB-SMF 430). The session management network element may obtain the policy of the multicast session based on the mapping relationship that is between service identification information and a policy and that is configured in the session management network element.

Further, the first message is further used to request to establish the multicast session.

Figure 10:
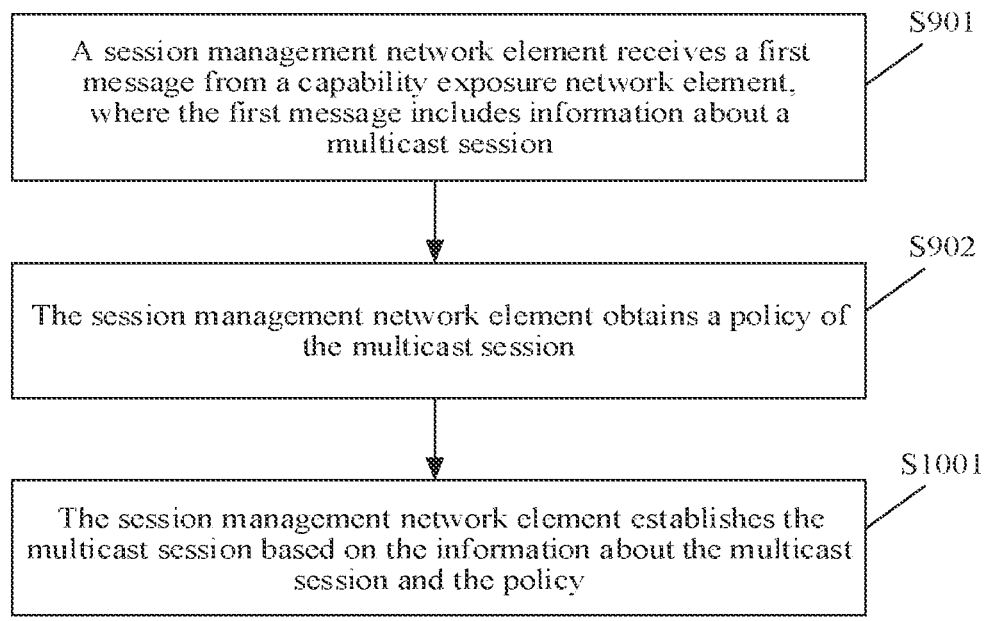
FIG. 10 is a flowchart 6 of a multicast session establishment method according to an embodiment of this application.

Optionally, as shown in FIG. 10, after S902, the multicast session establishment method provided in this embodiment of this application may further include the following steps.

S1001: The session management network element establishes the multicast session based on the information about the multicast session and the policy.

The established multicast session is used for multicast data transmission to a specific area. Establishing a multicast session means establishing a core network resource used for multicast transmission.

For ease of understanding, in this application, an example in which the capability exposure network element is the MB-NEF 410, the policy management network element is the MB-PCF 420, and the session management network element is the MB-SMF 430 is used, and several possible interaction processes of the multicast session establishment method are specifically described in the following Embodiment 1, Embodiment 2, Embodiment 3, and Embodiment 4.

Embodiment 1

In Embodiment 1, the MB-NEF 410 has a function of selecting an MB-PCF and an MB-SMF. The MB-PCF 420 has a function of policy management of a multicast session. The MB-SMF 430 has a function of multicast session management.

The policy management of the multicast session includes but is not limited to one or more of PCC, managing a QoS parameter of the multicast session, or managing a QoS flow generation rule. The multicast session management includes but is not limited to one or more of managing IP address allocation of the multicast session, selecting a user plane network element, or making a QoS flow generation decision.

In Embodiment 1, an application server 460 needs to establish the multicast session and simultaneously send multicast data to a specific area A multicast session establishment process is as follows. The MB-NEF 410 determines the MB-PCF 420 configured to perform policy management of the multicast session, and determines the MB-SMF 430 configured to perform multicast session management (for example, multicast session establishment). The MB-PCF 420 creates the policy based on an indication of the MB-NEF 410. After the MB-PCF 420 completes a policy decision, the MB-SMF 430 establishes, according to the policy, the multicast session used to transmit the multicast data.

Figure 11:
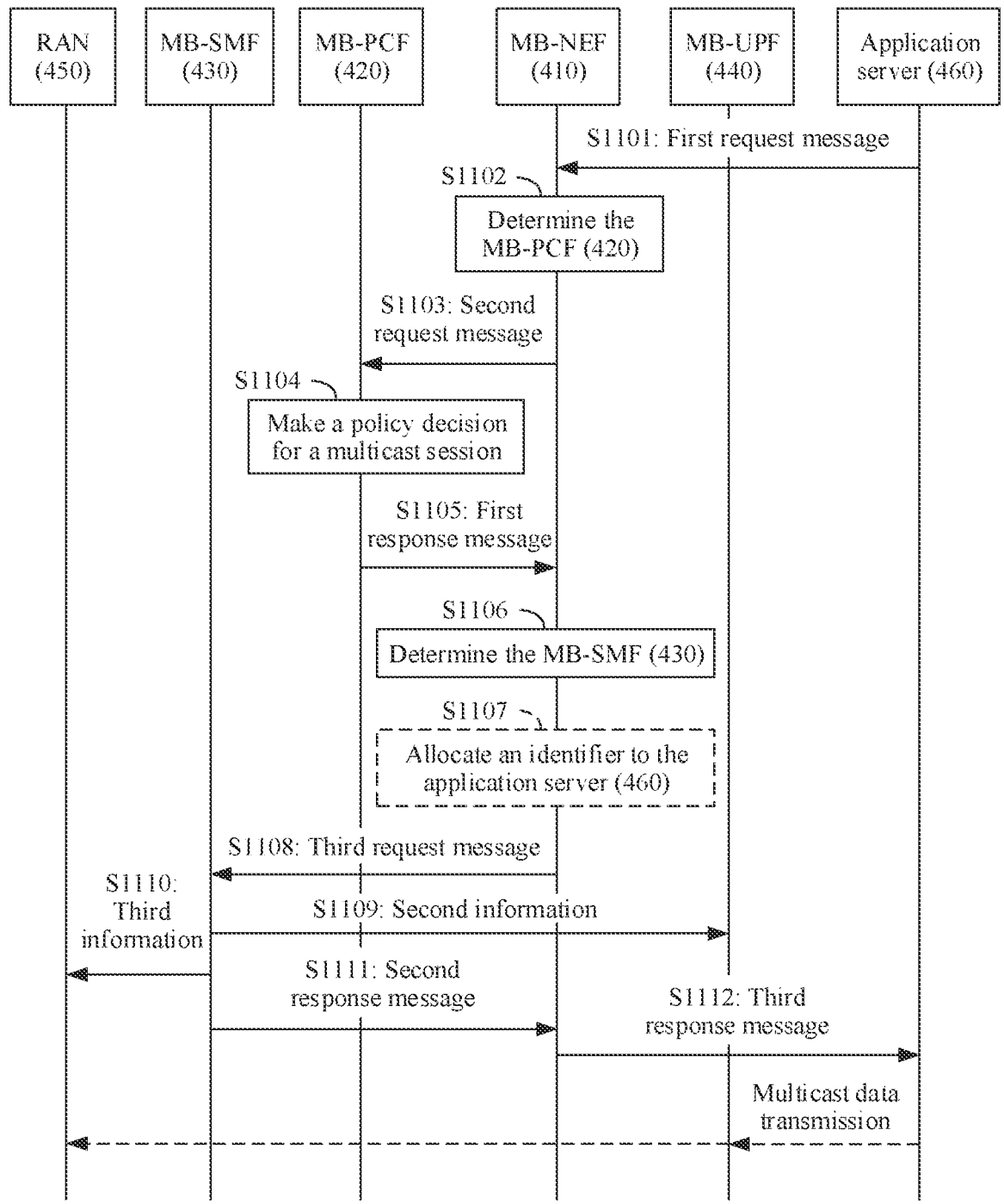
FIG. 11 is an interaction diagram 1 of a multicast session establishment method according to an embodiment of this application.

FIG. 11 is an interaction diagram 1 of a multicast session establishment method according to an embodiment of this application. As shown in FIG. 11, the multicast session establishment method provided in this embodiment of this application includes the following steps.

S1101: The MB-NEF 410 receives a first request message from the application server 460.

The first request message may be the foregoing third message. The first request message is used to request to establish a multicast session. For example, the first request message may be a multicast session establishment request message. Establishing a multicast session means establishing a core network resource used for multicast transmission.

In this embodiment of this application, the first request message includes information about the multicast session. The information about the multicast session may include any one or more of the following: quality requirement information, transmission area information, and service identification information that are of the multicast session. The quality requirement information of the multicast session is used to represent a quality requirement of the application server 460 on the multicast session. The transmission area information is used to represent a target area in multicast transmission. The service identification information is used to identify multicast data from the application server 460 in a multicast transmission process.

In this embodiment of this application, the quality requirement information of the multicast session may include but is not limited to one or more of a delay requirement, a transmission rate requirement, or a bandwidth requirement of the application server 460 on the multicast session. The application server 460 may send the service identification information to the MB-NEF 410 by including service data flow (SDF) template information in the first request message. For example, the SDF template information may include an IP address and a port number of the application server 460.

S1102: The MB-NEF 410 determines an MB-PCF 420. The MB-PCF 420 is configured to create a policy for the multicast session.

In this embodiment of this application, the MB-NEF 410 may determine the MB-PCF 420 based on the transmission area information included in the first request message and capability information of a plurality of PCFs in a transmission area indicated by the transmission area information.

It may be understood that a plurality of PCFs are usually deployed in a core network. Capabilities of the plurality of PCFs are different. For example, a part (namely, an MB-PCF) of the plurality of PCFs support policy management of the multicast session, and a part (namely, a conventional PCF) of the plurality of PCFs do not support policy management of the multicast session. The MB-NEF 410 may determine, based on the transmission area information and the capability information of the PCFs, an MB-PCF, such as the MB-PCF 420, configured to perform policy management of the multicast session (where for example, the PCF may establish a policy for the multicast session). The capability information of the PCF is used to indicate whether the PCF supports policy management of the multicast session, in other words, whether the PCF is an MB-PCF on which function expansion has been performed.

S1103: The MB-NEF 410 sends a second request message to the MB-PCF 420.

The second request message may be the first message shown in FIG. 5 or FIG. 6. The second request message is used to request the MB-PCF 420 to make a policy decision for the multicast session. For example, the second request message may be a policy request message.

The second request message may include one or more of the quality requirement information, the transmission area information, and the service identification information that are of the multicast session. The quality requirement information may include but is not limited to one or more of the delay requirement, the transmission rate requirement, or the bandwidth requirement of the application server 460 on the multicast session. The service identification information may include the IP address and the port number of the application server 460. A policy requested by the second request message is used to specify, but not limited to, one or more of a rule for establishing a QoS flow, an authorized QoS rule, a rule for identifying multicast data, or a rule for filtering multicast data.

S1104: The MB-PCF 420 makes the policy decision for the multicast session.

The policy may include any one or more of the following: identification information of the multicast data, a multicast session quality parameter (namely, an authorized QoS parameter of the multicast data), or a multicast data filtering parameter. The identification information of the multicast data is used to identify the multicast data from the application server 460. The multicast session quality parameter is used to specify transmission quality, for example, a transmission delay, a transmission rate, and a bandwidth, of the multicast data A multicast data filtering parameter is used to specify a receiving parameter of the multicast data.

In this embodiment of this application, the MB-PCF 420 may make the policy decision based on information such as the quality requirement information and the service identification information that are of the multicast session, to obtain the policy of the multicast session.

For example, the MB-PCF 420 may match, for the multicast session based on the quality requirement information of the multicast session, a quality parameter that can meet a requirement of the multicast session.

Optionally, a mapping relationship between service identification information and a policy may be preconfigured in the MB-PCF 420. The MB-PCF 420 may obtain the policy of the multicast session based on the mapping relationship that is between service identification information and a policy and that is preconfigured in the MB-PCF 420.

Optionally, a mapping relationship between quality requirement information and a policy may be preconfigured in the MB-PCF 420. The MB-PCF 420 may obtain the policy of the multicast session based on the mapping relationship that is between quality requirement information and a policy and that is preconfigured in the MB-PCF 420.

S1105: The MB-PCF 420 sends a first response message to the MB-NEF 410.

The first response message may be the second message shown in FIG. 5 or FIG. 6. The first response message may further include the policy or other information obtained by the MB-PCF 420. The first response message may further include at least one of the identification information of the multicast data, the multicast session quality parameter, and the multicast data filtering parameter. For example, the first response message may be a policy response message.

S1106: The MB-NEF 410 determines the MB-SMF 430. The MB-SMF 430 is configured to manage the multicast session.

In this embodiment of this application, the MB-NEF 410 may determine the MB-SMF 430 based on the transmission area information and capability information of a plurality of SMFs in the transmission area indicated by the transmission area information.

S1107: The MB-NEF 410 allocates transaction identification information to the application server 460.

The transaction identification information is used to identify first information. The first information is context information that is for establishing the multicast session and that is stored in the MB-NEF 410.

In this embodiment of this application, the first information may include but is not limited to one or more of the policy, the transaction identification information, identification information of the application server 460, and identification information of the MB-SMF 430. The identification information of the application server 460 may be the IP address of the application server 460, a fully qualified domain name (FQDN) of the application server 460, or the like. The identification information of the MB-SMF 430 may be an IP address of the MB-SMF 430, an FQDN of the MB-SMF 430, or the like.

Further, the first information may further include identification information of the MB-PCF 420 and/or group identification information of the multicast session. The identification information of the MB-PCF 420 may be an IP address of the MB-PCF 420, an FQDN of the MB-PCF 420, or the like. The group identification information of the multicast session is used to identify configuration information that is sent on an air interface and that is used by UE to receive multicast group data, for example, a frequency for receiving the multicast group data. Then, when the application server sends an update request/a modification request/a deletion request, a corresponding context/session may be found based on the identification information of the MB-PCF 420.

It should be noted that S1 107 is optional. To be specific, after performing S1106, the MB-NEF 410 may perform S1108 without performing S1107.

S1108: The MB-NEF 410 sends a third request message to the MB-SMF 430.

The third request message may be a fourth message. The third request message is used to request the MB-SMF 430 to establish the multicast session. For example, the third request message may be a multicast session establishment request message.

In this embodiment of this application, the third request message includes some or all information in the policy obtained by the MB-PCF 420, or other information obtained by the MB-PCF 420. The third request message may further include but is not limited to the transmission area information and/or the service identification information.

It should be noted that a sequence of performing S1107 and S1108 is not limited in this embodiment of this application. For example, S1107 may be performed before S1108, or S1108 may be performed before S1107.

S1109: The MB-SMF 430 sends second information to an MB-UPF 440.

The second information is used by the MB-UPF 440 to identify the multicast data from the application server 460. The second information includes but is not limited to the service identification information.

In this embodiment of this application, the MB-UPF 440 may be determined by the MB-SMF 430 based on the transmission area information and capability information of a plurality of UPFs in the transmission area indicated by the transmission area information. The MB-UPF 440 is configured to identify the multicast data from the application server 460 based on the service identification information. The capability information of the UPF is used to indicate whether the UPF supports multicast data transmission.

In this embodiment of this application, the second information may further include a charging rule of the multicast data. The charging rule may be from the third request message, and further be from the policy obtained by the MB-PCF 420. That is, the policy in S1104 may further include the charging rule of the multicast data. The MB-UPF 440 is further configured to charge the identified multicast data according to the charging rule of the multicast data. The capability information of the UPF is further used to indicate whether the UPF supports charging the multicast data.

In this embodiment of this application, the MB-SMF 430 may send the second information to the MB-UPF 440 based on an N4 session establishment message. N4 is a reference point between the MB-SMF 430 and the MB-UPF 440.

S1110: The MB-SMF 430 sends third information to a RAN 450.

The third information is used by the RAN 450 to perform multicast transmission configuration. The third information may include but is not limited to some or all information in the policy obtained by the MB-PCF 420, or other information obtained by the MB-PCF 420. The multicast transmission configuration includes but is not limited to any one or more of the following: establishing a context of multicast transmission, configuring a QoS parameter, or processing multicast data.

In this embodiment of this application, the QoS parameter may include but is not limited to one or more of multicast session quality (such as a 5QI), a QoS class identifier (QCI), an allocation/retention priority (ARP), a guaranteed flow bit rate (GFBR), or a maximum flow bit rate (MFBR).

The GFBR is used to describe a fixed bit rate during multicast data transmission. The MFBR is used to describe a maximum bit rate during multicast data transmission.

The QCI is used to describe a transmission characteristic of multicast data. The ARP is used to describe a priority of a user and/or a priority of a type of a service requested by the user, so as to perform resource allocation based on the ARP and perform resource preemption between different services when resources are insufficient.

In this embodiment of this application, the third information may further include the identification information of the multicast data. The identification information of the multicast data may be allocated by the MB-SMF 430. The identification information of the multicast data is used by the RAN 450 to identify corresponding multicast data from the MB-UPF 440. This is because the multicast data is sent from the MB-UPF 440 to the RAN 450 in an IP multicast routing manner. For example, the RAN 450 may send an internet group management protocol (IGMP) join message to the MB-UPF 440 based on the identification information of the multicast data, and an intermediate router records a downlink transmission path. When a plurality of RANs send IGMP join messages, a downlink multicast tree is formed. In this embodiment of this application, the MB-SMF 430 may send the third information to the RAN 450 based on an N2 message. N2 is a reference point between the MB-SMF 430 and the RAN 450.

Further, the third information may further include the group identification information of the multicast session. The group identification information of the multicast session is used by the RAN 450 to identify configuration information that is sent on an air interface and is used by the UE to receive the multicast group data, for example, the frequency for receiving the multicast group data.

S1111: The MB-SMF 430 sends a second response message to the MB-NEF 410.

The second response message is used to indicate that the multicast session has been established. For example, the second response message may be a multicast session establishment response message.

The second response message may include but is not limited to identification information of the MB-UPF 440. For example, the identification information of the MB-UPF 440 may include IP address information and port number information that are of the MB-UPF 440. The identification information of the MB-UPF 440 may be an IP address of the MB-UPF 440, an FQDN of the MB-UPF 440, or the like.

S1112: The MB-NEF 410 sends a third response message to the application server 460.

The third response message is used to indicate that the multicast session has been established. For example, the third response message may be a multicast session establishment response message. The third response message may include but is not limited to the identification information of the MB-UPF 440 and/or the transaction identification information. Then, when the application server sends an update request/a modification request/a deletion request, a corresponding context/session may be found based on the transaction identification information.

Embodiment 2

In Embodiment 2, the MB-NEF 410 has a function of selecting an MB-PCF. The MB-PCF 420 has a function of selecting an MB-SMF and a function of policy management of a multicast session. The MB-SMF 430 has a function of multicast session management.

In Embodiment 2, an application server 460 needs to establish the multicast session and simultaneously send multicast data to a specific area. A multicast session establishment process is as follows. The MB-NEF 410 determines the MB-PCF 420 configured to perform policy management of the multicast session. The MB-PCF 420 makes a policy decision based on an indication of the MB-NEF 410, and determines the MB-SMF 430 for multicast session management (such as multicast session establishment). After the MB-PCF 420 completes the policy decision, the MB-SMF 430 establishes, according to a determined policy, the multicast session used to transmit the multicast data.

Figure 12:
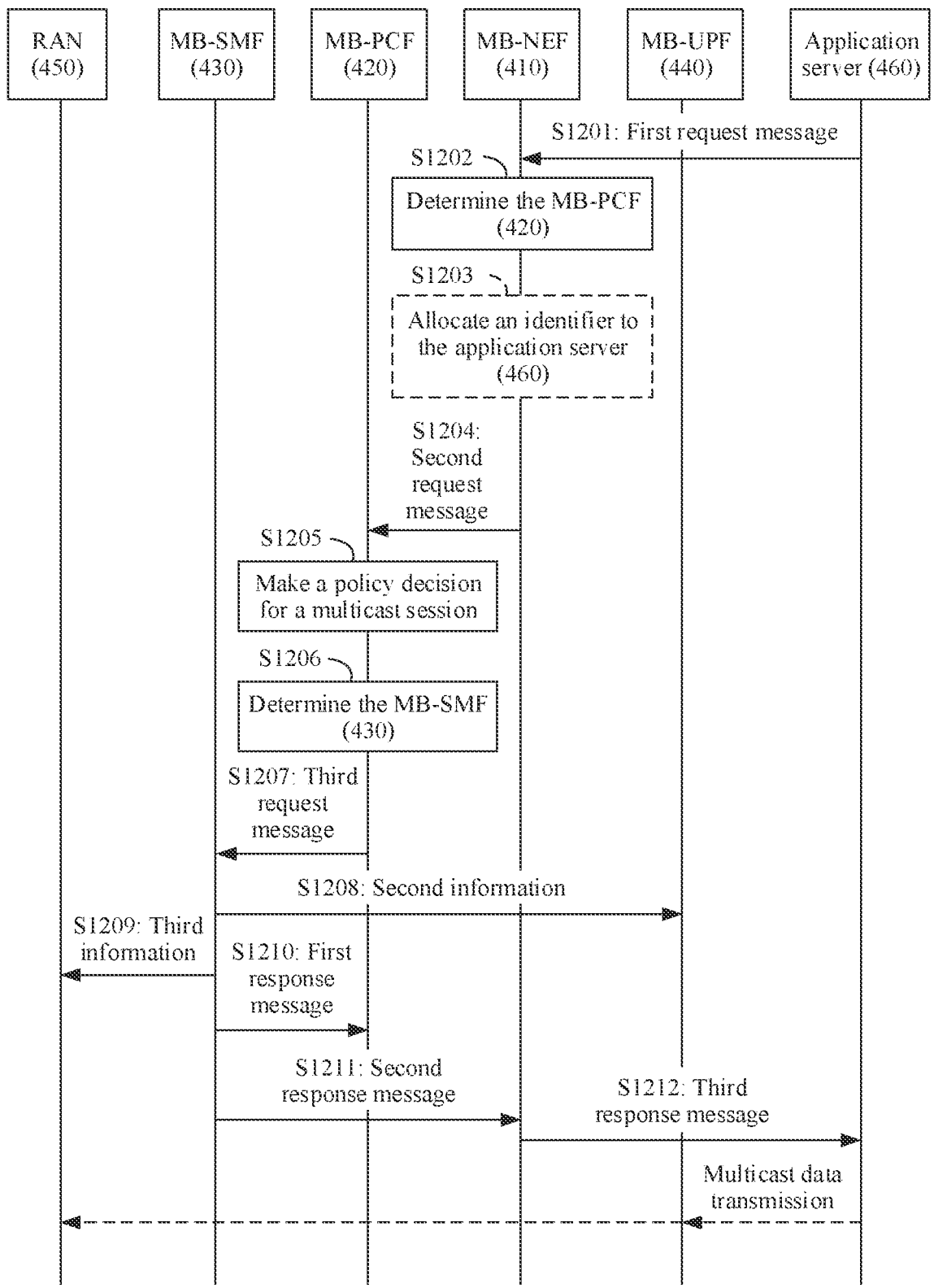
FIG. 12 is an interaction diagram 2 of a multicast session establishment method according to an embodiment of this application.

FIG. 12 is an interaction diagram 2 of a multicast session establishment method according to an embodiment of this application. As shown in FIG. 12, the multicast session establishment method provided in this embodiment of this application includes the following steps.

S1201: The MB-NEF 410 receives a first request message from the application server 460.

The first request message may be the foregoing third message. The first request message is used to request to establish a multicast session. For example, the first request message may be a multicast session establishment request message. Establishing a multicast session means establishing a core network resource used for multicast transmission.

In this embodiment of this application, the first request message includes information about the multicast session. The information about the multicast session may include any one or more of the following: quality requirement information, transmission area information, and service identification information that are of the multicast session.

S1202: The MB-NEF 410 determines the MB-PCF 420. The MB-PCF 420 is configured to create a policy for the multicast session.

In this embodiment of this application, the MB-NEF 410 may determine the MB-PCF 420 based on the transmission area information included in the first request message and capability information of a plurality of PCFs in a transmission area indicated by the transmission area information.

S1203: The MB-NEF 410 allocates transaction identification information to the application server 460.

The transaction identification information is used to identify first information. The first information includes context information that is for establishing the multicast session and that is stored in the MB-NEF 410, and/or context information that is for establishing the multicast session and that is stored in the MB-PCF 420. The context information that is for establishing the multicast session and that is stored in the MB-PCF 420 is described in detail in the following.

In this embodiment of this application, the first information may include but is not limited to one or more of identification information that is of the MB-PCF 420 and that is stored in the MB-NEF 410, the transaction identification information, identification information of the application server 460, and group identification information of the multicast session. The group identification information of the multicast session is used to identify configuration information that is sent on an air interface and that is used by UE to receive multicast group data, for example, a frequency for receiving the multicast group data. It should be noted that a sequence of performing S1203 and S1204 is not limited in this embodiment of this application. For example, S1203 may be performed before S1204, or S1204 may be performed before S1203.

It should be noted that S1203 is optional. To be specific, after performing S1202, the MB-NEF 410 may perform S1204 without performing S1203.

S1204: The MB-NEF 410 sends a second request message to the MB-PCF 420.

The second request message may be the first message shown in FIG. 5, FIG. 6, or FIG. 7. The second request message is used to request the MB-PCF 420 to make a policy decision for the multicast session. For example, the second request message may be a policy request message.

In this embodiment of this application, the second request message may include one or more of the quality requirement information, the transmission area information, and the service identification information that are of the multicast session. The quality requirement information may include but is not limited to one or more of a delay requirement, a transmission rate requirement, or a bandwidth requirement of the application server 460 on the multicast session. The service identification information may include an IP address and a port number of the application server 460. A policy requested by the second request message is used to specify, but not limited to, one or more of a rule for establishing a QoS flow, an authorized QoS rule, a rule for identifying multicast data, or a rule for filtering multicast data.

S1205: The MB-PCF 420 makes the policy decision for the multicast session.

The policy may include any one or more of the following: identification information of the multicast data, a multicast session quality parameter (namely, an authorized QoS parameter of the multicast data), or a multicast data filtering parameter. The identification information of the multicast data is used to identify the multicast data from the application server 460. The multicast session quality parameter is used to specify transmission quality, for example, a transmission delay, a transmission rate, and a bandwidth, of the multicast data. The multicast data filtering parameter is used to specify a receiving parameter of the multicast data.

In this embodiment of this application, the MB-PCF 420 may create the policy for the multicast session based on information such as the quality requirement information and the service identification information that are of the multicast session.

For example, the MB-PCF 420 may match, for the multicast session based on the quality requirement information of the multicast session, a quality parameter that can meet a requirement of the multicast session.

Optionally, a mapping relationship between service identification information and a policy may be preconfigured in the MB-PCF 420. The MB-PCF 420 may obtain the policy of the multicast session based on the mapping relationship that is between service identification information and a policy and that is preconfigured in the MB-PCF 420.

Optionally, a mapping relationship between quality requirement information and a policy may be preconfigured in the MB-PCF 420. The MB-PCF 420 may obtain the policy of the multicast session based on the mapping relationship that is between quality requirement information and a policy and that is preconfigured in the MB-PCF 420.

S1206: The MB-PCF 420 determines the MB-SMF 430. The MB-SMF 430 is configured to manage the multicast session.

In this embodiment of this application, the MB-PCF 420 may determine the MB-SMF 430 based on the transmission area information and capability information of a plurality of SMFs in the transmission area indicated by the transmission area information.

Further, the MB-PCF 420 may further store context information for establishing the multicast session. For example, the context information for establishing the multicast session may include but is not limited to one or more of the transaction identification information, the policy, the identification information of the application server 460, and identification information of the MB-SMF 430. The transaction identification information is used to identify the context information that is for establishing the multicast session and that is stored in the MB-PCF 420.

S1207: The MB-PCF 420 sends a third request message to the MB-SMF 430.

The third request message may be the second message shown in FIG. 5, FIG. 6, or FIG. 7. The third request message is used to request the MB-SMF 430 to establish the multicast session. For example, the third request message may be a multicast session establishment request message.

In this embodiment of this application, the third request message includes some or all information in the policy obtained by the MB-PCF 420, or other information obtained by the MB-PCF 420. The third request message may further include but is not limited to the transmission area information and/or the service identification information. For example, the third request message may further include the policy.

S1208: The MB-SMF 430 sends second information to an MB-UPF 440.

The second information is used by the MB-UPF 440 to identify the multicast data from the application server 460. The second information includes but is not limited to the service identification information.

In this embodiment of this application, the MB-UPF 440 may be determined by the MB-SMF 430 based on the transmission area information and capability information of a plurality of UPFs in the transmission area indicated by the transmission area information. The MB-UPF 440 is configured to identify the multicast data from the application server 460 based on the service identification information. The capability information of the UPF is used to indicate whether the UPF supports multicast data transmission.

Further, the second information may further include a charging rule of the multicast data. The charging rule may be from the third request message, and further be from the policy obtained by the MB-PCF 420. That is, the policy in S1205 may further include the charging rule of the multicast data. The MB-UPF 440 is further configured to charge the identified multicast data according to the charging rule of the multicast data. The capability information of the UPF is further used to indicate whether the UPF supports charging the multicast data.

In this embodiment of this application, the MB-SMF 430 may send the second information to the MB-UPF 440 based on an N4 session establishment message. N4 is a reference point between the MB-SMF 430 and the MB-UPF 440.

S1209: The MB-SMF 430 sends third information to a RAN 450.

The third information is used by the RAN 450 to perform multicast transmission configuration. The third information may include but is not limited to the policy created by the MB-PCF 420. The multicast transmission configuration includes but is not limited to any one or more of the following: establishing a context of multicast transmission, configuring a QoS parameter, or processing multicast data.

For descriptions of the QoS parameter, refer to the descriptions in Embodiment 1. Details are not described herein again.

Further, the third information may further include the identification information of the multicast data. The identification information of the multicast data may be allocated by the MB-SMF 430. The identification information of the multicast data is used by the RAN 450 to identify corresponding multicast data from the MB-UPF 440. For example, the RAN 450 may send an IGMP join message to the MB-UPF 440 based on the identification information of the multicast data, and an intermediate router records a downlink transmission path. In this embodiment of this application, the MB-SMF 430 may send the third information to the RAN 450 based on an N2 message. N2 is a reference point between the MB-SMF 430 and the RAN 450.

S1210: The MB-SMF 430 sends a first response message to the MB-PCF 420.

The first response message is used to indicate that the multicast session has been established. For example, the first response message may be a multicast session establishment response message.

The first response message may include but is not limited to identification information of the MB-UPF 440. For example, the identification information of the MB-UPF 440 may include IP address information and port number information that are of the MB-UPF 440.

S1211: The MB-SMF 430 sends a second response message to the MB-NEF 410.

The second response message is used to indicate that the multicast session has been established. For example, the second response message may be a multicast session establishment response message. The second response message may include but is not limited to the identification information of the MB-UPF 440.

S1212: The MB-NEF 410 sends a third response message to the application server 460.

The third response message is used to indicate that the multicast session has been established. For example, the third response message may be a multicast session establishment response message. The third response message may include but is not limited to the identification information of the MB-UPF 440 and/or the transaction identification information.

Embodiment 3

In Embodiment 3, the MB-NEF 410 has a function of selecting the MB-SMF 430. The MB-SMF 430 has a function of determining a policy of a multicast session, and has a function of multicast session management.

A mapping relationship between quality requirement information and a policy is preconfigured in the MB-SMF 430, or a mapping relationship between service identification information and a policy is preconfigured in the MB-SMF 430. That the MB-SMF 430 has a function of determining a policy means that the MB-SMF 430 has a function of determining the policy of the multicast session based on the mapping relationship that is between quality requirement information (or service identification information) and a policy and that is preconfigured in the MB-SMF 430. The multicast session management includes but is not limited to one or more of managing IP address allocation of the multicast session, selecting a user plane network element, or making a QoS flow generation decision.

In Embodiment 3, an application server 460 needs to establish the multicast session and simultaneously send multicast data to a specific area. A multicast session establishment process is as follows: The MB-NEF 410 determines the MB-SMF 430 configured to perform multicast session management (for example, multicast session establishment). The MB-SMF 430 determines the policy based on the mapping relationship that is between quality requirement information (or service identification information) and a policy and that is preconfigured in the MB-SMF 430, and establishes, according to the determined policy, the multicast session used to transmit the multicast data.

Figure 13:
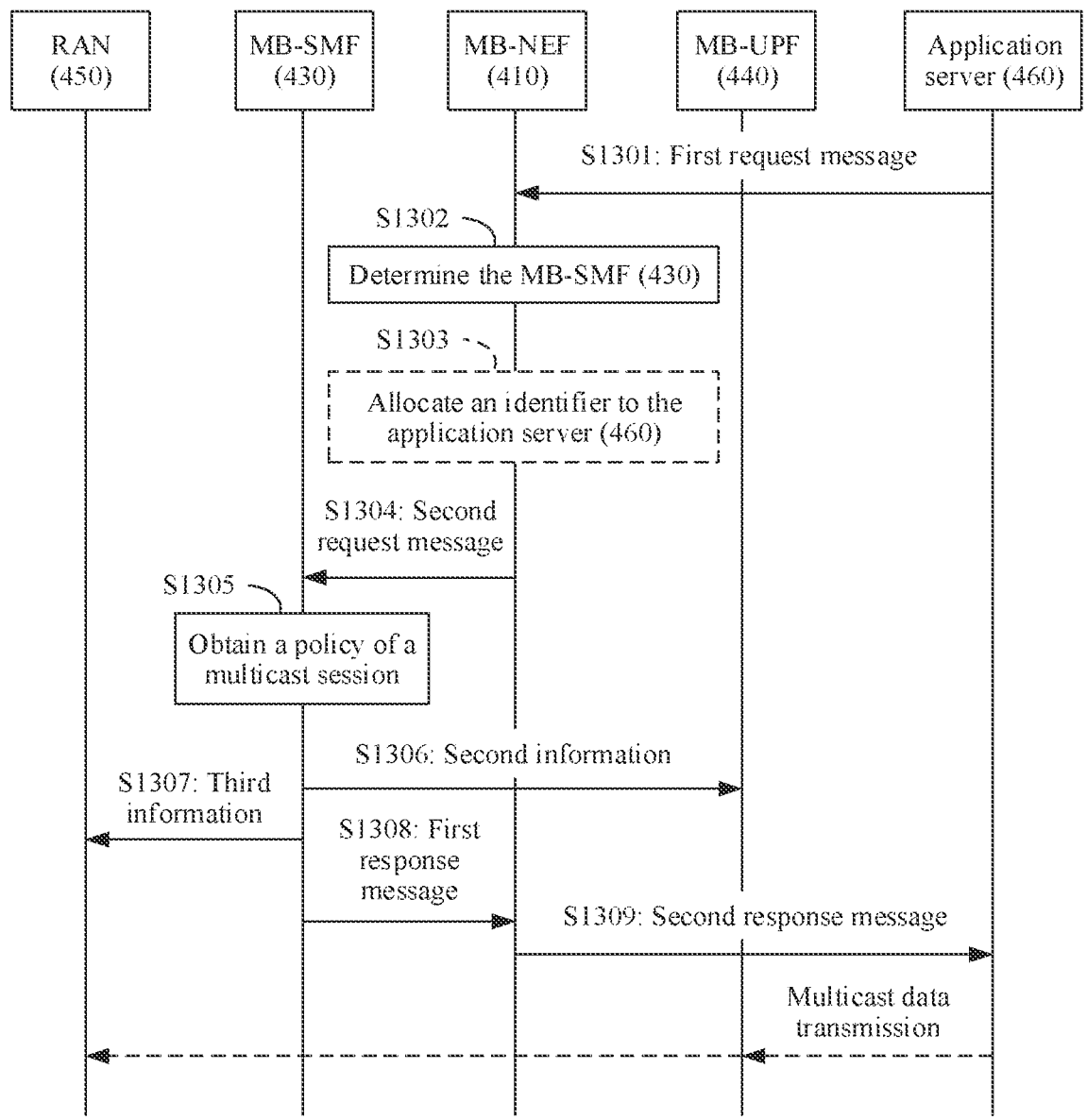
FIG. 13 is an interaction diagram 3 of a multicast session establishment method according to an embodiment of this application.

FIG. 13 is an interaction diagram 3 of a multicast session establishment method according to an embodiment of this application. As shown in FIG. 13, the multicast session establishment method provided in this embodiment of this application includes the following steps.

S1301: The MB-NEF 410 receives a first request message from the application server 460.

The first request message is used to request to establish a multicast session. For example, the first request message may be a multicast session establishment request message. Establishing a multicast session means establishing a core network resource used for multicast transmission.

In this embodiment of this application, the first request message includes information about the multicast session. The information about the multicast session may include any one or more of the following: quality requirement information, transmission area information, and service identification information that are of the multicast session.

S1302: The MB-NEF 410 determines the MB-SMF 430. The MB-SMF 430 is configured to determine the policy and manage the multicast session.

In this embodiment of this application, the MB-NEF 410 may determine the MB-SMF 430 based on the transmission area information and capability information of a plurality of SMFs in a transmission area indicated by the transmission area information.

S1303: The MB-NEF 410 allocates transaction identification information to the application server 460.

The transaction identification information is used to identify first information. The first information includes context information that is for establishing the multicast session and that is stored in the MB-NEF 410. For example, the context information that is for establishing the multicast session and that is stored in the MB-NEF 410 may include but is not limited to one or more of the transaction identification information, identification information of the application server 460, and identification information of the MB-SMF 430.

Further, the context information that is for establishing the multicast session and that is stored in the MB-NEF 410 may further include a group identifier of the multicast session. The group identification information of the multicast session is used to identify configuration information that is sent on an air interface and that is used by UE to receive multicast group data, for example, a frequency for receiving the multicast group data.

It should be noted that a sequence of performing S1303 and S1304 is not limited in this embodiment of this application. For example, S1303 may be performed before S1304, or S1304 may be performed before S1303.

It should be noted that S1303 is optional. To be specific, after performing S1302, the MB-NEF 410 may perform S1304 without performing S1303.

S1304: The MB-NEF 410 sends a second request message to the MB-SMF 430.

The second request message may be the first message shown in FIG. 9 or FIG. 10. The second request message is used to request the MB-SMF 430 to establish the multicast session. For example, the second request message may be a multicast session establishment request message.

In this embodiment of this application, the second request message may include but is not limited to the transmission area information and/or the service identification information.

S1305: The MB-SMF 430 obtains the policy of the multicast session.

The policy may include any one or more of the following: identification information of multicast data, a multicast session quality parameter (namely, an authorized QoS parameter of the multicast data), or a multicast data filtering parameter. The identification information of the multicast data is used to identify multicast data from the application server 460. The multicast session quality parameter is used to specify transmission quality, for example, a transmission delay, a transmission rate, and a bandwidth, of the multicast data. The multicast data filtering parameter is used to specify a receiving parameter of the multicast data.

In this embodiment of this application, a mapping relationship between service identification information and a policy may be preconfigured in the MB-SMF 430. The MB-SMF 430 may obtain the policy of the multicast session based on the mapping relationship that is between service identification information and a policy and that is preconfigured in the MB-SMF 430.

Optionally, a mapping relationship between quality requirement information and a policy may be preconfigured in the MB-SMF 430. The MB-SMF 430 may obtain the policy of the multicast session based on the mapping relationship that is between quality requirement information and a policy and that is preconfigured in the MB-SMF 430.

S1306: The MB-SMF 430 sends second information to an MB-UPF 440.

The second information is used by the MB-UPF 440 to identify the multicast data from the application server 460. The second information includes but is not limited to the service identification information.

In this embodiment of this application, the MB-UPF 440 may be determined by the MB-SMF 430 based on the transmission area information and capability information of a plurality of UPFs in the transmission area indicated by the transmission area information. The MB-UPF 440 is configured to identify the multicast data from the application server 460 based on the service identification information. The capability information of the UPF is used to indicate whether the UPF supports multicast data transmission.

Further, the second information may further include a charging rule of the multicast data. The charging rule may be from the policy obtained by the MB-SMF 430. That is, the policy in S1305 may further include the charging rule of the multicast data. The MB-UPF 440 is further configured to charge the identified multicast data according to the charging rule of the multicast data. The capability information of the UPF is further used to indicate whether the UPF supports charging the multicast data.

In this embodiment of this application, the MB-SMF 430 may send the second information to the MB-UPF 440 based on an N4 session establishment message. N4 is a reference point between the MB-SMF 430 and the MB-UPF 440.

S1307. The MB-SMF 430 sends third information to a RAN 450.

The third information is used by the RAN 450 to perform multicast transmission configuration. The third information may include but is not limited to the policy created by the MB-PCF 420. The multicast transmission configuration includes but is not limited to any one or more of the following: establishing a context of multicast transmission, configuring a QoS parameter, or processing multicast data. For descriptions of the QoS parameter, refer to the descriptions in Embodiment 1. Details are not described herein again.

Further, the third information may further include the identification information of the multicast data. The identification information of the multicast data may be allocated by the MB-SMF 430. The identification information of the multicast data is used by the RAN 450 to identify corresponding multicast data from the MB-UPF 440. For example, the RAN 450 may send an IGMP join message to the MB-UPF 440 based on the identification information of the multicast data, and an intermediate router records a downlink transmission path. In this embodiment of this application, the MB-SMF 430 may send the third information to the RAN 450 based on an N2 message. N2 is a reference point between the MB-SMF 430 and the RAN 450.

S1308: The MB-SMF 430 sends a first response message to the MB-NEF 410.

The first response message is used to indicate that the multicast session has been established. For example, the first response message may be a multicast session establishment response message. The first response message may include but is not limited to identification information of the MB-UPF 440.

S1309: The MB-NEF 410 sends a second response message to the application server 460.

The second response message is used to indicate that the multicast session has been established. For example, the second response message may be a multicast session establishment response message. The second response message may include but is not limited to the identification information of the MB-UPF 440 and/or the transaction identification information.

Embodiment 4

In Embodiment 4, the MB-NEF 410 has a function of selecting an MB-PCF and an MB-SMF. The MB-PCF 420 has a function of policy management of a multicast session. The MB-SMF 430 has a function of multicast session management.

The policy management of the multicast session includes but is not limited to one or more of PCC, managing a QoS parameter of the multicast session, or managing a QoS flow generation rule. The multicast session management includes but is not limited to one or more of managing IP address allocation of the multicast session, selecting a user plane network element, or making a QoS flow generation decision.

In Embodiment 4, an application server 460 needs to establish the multicast session and simultaneously send multicast data to a specific area. A multicast session establishment process is as follows: The MB-NEF 410 determines the MB-PCF 420 configured to perform policy management of the multicast session, and determines the MB-SMF 430 configured to perform multicast session management (for example, multicast session establishment). The MB-PCF 420 makes a policy decision for the multicast session based on an indication of the MB-SMF 430. After the MB-PCF 420 completes the policy decision, the MB-SMF 430 establishes, according to the policy, the multicast session used to transmit the multicast data.

Figure 14:
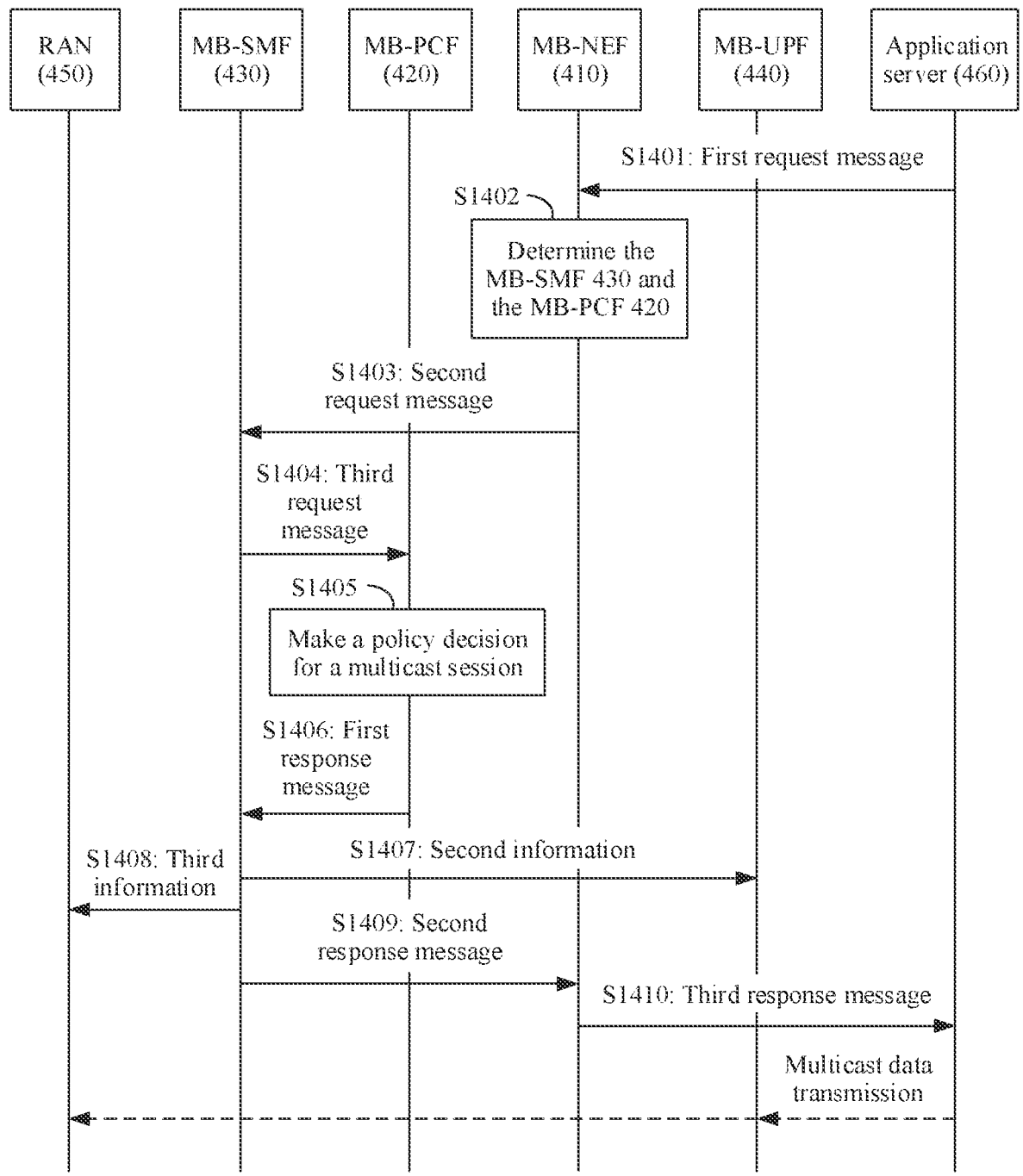
FIG. 14 is an interaction diagram 4 of a multicast session establishment method according to an embodiment of this application.

FIG. 14 is an interaction diagram 4 of a multicast session establishment method according to an embodiment of this application. As shown in FIG. 14, the multicast session establishment method provided in this embodiment of this application includes the following steps.

S1401: The MB-NEF 410 receives a first request message from the application server 460.

The first request message may be the foregoing third message. The first request message is used to request to establish a multicast session. For example, the first request message may be a multicast session establishment request message. Establishing a multicast session means establishing a core network resource used for multicast transmission.

In this embodiment of this application, the first request message includes information about the multicast session. The information about the multicast session may include any one or more of the following: quality requirement information, transmission area information, and service identification information that are of the multicast session.

S1402: The MB-NEF 410 determines the MB-SMF 430 and the MB-PCF 420.

The MB-SMF 430 is configured to manage the multicast session. The MB-PCF 420 is configured to create a policy for the multicast session.

In this embodiment of this application, the MB-NEF 410 may determine the MB-SMF 430 based on the transmission area information included in the first request message and capability information of a plurality of SMFs in a transmission area indicated by the transmission area information.

In this embodiment of this application, the MB-NEF 410 may determine the MB-PCF 420 based on the transmission area information included in the first request message and capability information of a plurality of PCFs in the transmission area indicated by the transmission area information.

S1403: The MB-NEF 410 sends a second request message to the MB-SMF 430.

The second request message is used to request the MB-SMF 430 to establish the multicast session. For example, the second request message may be a multicast session establishment request message.

In this embodiment of this application, the second request message includes identification information of the MB-PCF 420. The second request message may further include one or more of the quality requirement information, the transmission area information, and the service identification information that are of the multicast session. The quality requirement information may include but is not limited to one or more of a delay requirement, a transmission rate requirement, or a bandwidth requirement of the application server 460 on the multicast session. The service identification information may include an IP address and a port number of the application server 460.

S1404: The MB-SMF 430 sends a third request message to the MB-PCF 420.

The third request message may be the first message shown in FIG. 5 or FIG. 8. The third request message is used to request the MB-PCF 420 to make a policy decision for the multicast session. For example, the third request message may be a policy request message.

In this embodiment of this application, the third request message may include one or more of the quality requirement information, the transmission area information, and the service identification information that are of the multicast session. A policy requested by the third request message is used to specify, but not limited to, one or more of a rule for establishing a QoS flow, an authorized QoS rule, a rule for identifying multicast data, or a rule for filtering multicast data. S1405: The MB-PCF 420 makes the policy decision for the multicast session.

The policy may include any one or more of the following: identification information of the multicast data, a multicast session quality parameter (namely, an authorized QoS parameter of the multicast data), or a multicast data filtering parameter. The identification information of the multicast data is used to identify multicast data from the application server 460. The multicast session quality parameter is used to specify transmission quality, for example, a transmission delay, a transmission rate, and a bandwidth, of the multicast data. The multicast data filtering parameter is used to specify a receiving parameter of the multicast data.

In this embodiment of this application, the MB-PCF 420 may create the policy for the multicast session based on information such as the quality requirement information and the service identification information that are of the multicast session.

For example, the MB-PCF 420 may match, for the multicast session based on the quality requirement information of the multicast session, a quality parameter that can meet a requirement of the multicast session.

Optionally, a mapping relationship between service identification information and a policy may be preconfigured in the MB-PCF 420. The MB-PCF 420 may obtain the policy of the multicast session based on the mapping relationship that is between service identification information and a policy and that is preconfigured in the MB-PCF 420.

In some other embodiments, a mapping relationship between quality requirement information and a policy may be preconfigured in the MB-PCF 420. The MB-PCF 420 may obtain the policy of the multicast session based on the mapping relationship that is between quality requirement information and a policy and that is preconfigured in the MB-PCF 420.

S1406: The MB-PCF 420 sends a first response message to the MB-SMF 430.

The first response message may be the second message shown in FIG. 5 or FIG. 8. For example, the third request message may be a policy response message.

In this embodiment of this application, the first response message includes the policy.

S1407. The MB-SMF 430 sends second information to an MB-UPF 440.

The second information is used by the MB-UPF 440 to identify the multicast data from the application server 460. The second information includes but is not limited to the service identification information.

In this embodiment of this application, the MB-UPF 440 may be determined by the MB-SMF 430 based on the transmission area information and capability information of a plurality of UPFs in the transmission area indicated by the transmission area information. The MB-UPF 440 is configured to identify the multicast data from the application server 460 based on the service identification information. The capability information of the UPF is used to indicate whether the UPF supports multicast data transmission.

Further, the second information may further include a charging rule of the multicast data. The charging rule may be from the first response message, and further be from the policy obtained by the MB-PCF 420. That is, the policy in S1405 may further include the charging rule of the multicast data. The MB-UPF 440 is further configured to charge the identified multicast data according to the charging rule of the multicast data. The capability information of the UPF is further used to indicate whether the UPF supports charging the multicast data.

In this embodiment of this application, the MB-SMF 430 may send the second information to the MB-UPF 440 based on an N4 session establishment message. N4 is a reference point between the MB-SMF 430 and the MB-UPF 440.

S1408: The MB-SMF 430 sends third information to a RAN 450.

The third information is used by the RAN 450 to perform multicast transmission configuration. The third information may include but is not limited to the policy created by the MB-PCF 420. The multicast transmission configuration includes but is not limited to any one or more of the following: establishing a context of multicast transmission, configuring a QoS parameter, or processing multicast data. For descriptions of the QoS parameter, refer to the descriptions in Embodiment 1. Details are not described herein again.

Further, the third information may further include the identification information of the multicast data. The identification information of the multicast data may be allocated by the MB-SMF 430. The identification information of the multicast data is used by the RAN 450 to identify corresponding multicast data from the MB-UPF 440. For example, the RAN 450 may send an IGMP join message to the MB-UPF 440 based on the identification information of the multicast data, and an intermediate router records a downlink transmission path. In this embodiment of this application, the MB-SMF 430 may send the third information to the RAN 450 based on an N2 message. N2 is a reference point between the MB-SMF 430 and the RAN 450.

S1409: The MB-SMF 430 sends a second response message to the MB-NEF 410.

The second response message is used to indicate that the multicast session has been established. For example, the second response message may be a multicast session establishment response message. The second response message may include but is not limited to identification information of the MB-UPF 440.

S1410: The MB-NEF 410 sends a third response message to the application server 460.

The third response message is used to indicate that the multicast session has been established. For example, the third response message may be a multicast session establishment response message. The third response message may include but is not limited to the identification information of the MB-UPF 440 and/or transaction identification information.

Optionally, the multicast session establishment method provided in Embodiment 4 of this application further includes: The MB-PCF 420 allocates the transaction identification information to the application server 460. The MB-PCF 420 stores first information.

The transaction identification information is used to identify the first information. The first information includes context information for establishing the multicast session. The context information for establishing the multicast session may include but is not limited to one or more of the transaction identification information, the policy, identification information of the application server 460, or identification information of the MB-SMF 430.

Embodiment 5

In Embodiment 5, the MB-NEF 410 has a function of selecting an MB-PCF and an MB-SMF. The MB-PCF 420 has a function of policy management of a multicast session. The MB-SMF 430 has a function of multicast session management.

The policy management of the multicast session includes but is not limited to one or more of PCC, managing a QoS parameter of the multicast session, or managing a QoS flow generation rule. The multicast session management includes but is not limited to one or more of managing IP address allocation of the multicast session, selecting a user plane network element, or making a QoS flow generation decision.

In Embodiment 5, an application server 460 needs to establish the multicast session and simultaneously send multicast data to a specific area. A multicast session establishment process is as follows. The MB-NEF 410 determines the MB-PCF 420 configured to perform policy management of the multicast session, and determines the MB-SMF 430 configured to perform multicast session management (for example, multicast session establishment). The MB-PCF 420 makes a policy decision for the multicast session based on an indication of the MB-NEF 410. After the MB-PCF 420 completes the policy decision, the MB-SMF 430 establishes, according to the policy, the multicast session used to transmit the multicast data.

Figure 15:
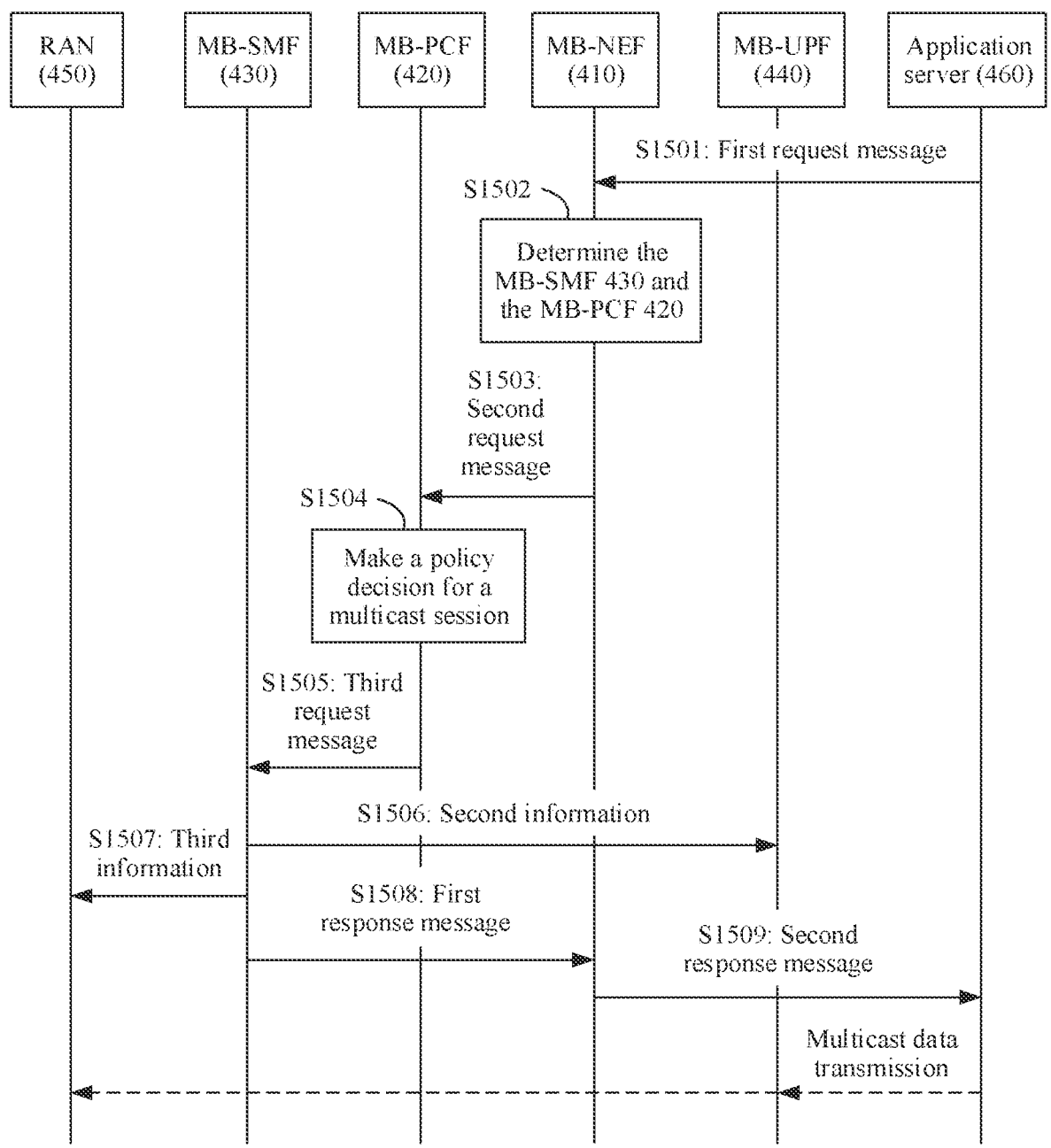
FIG. 15 is an interaction diagram 5 of a multicast session establishment method according to an embodiment of this application.

FIG. 15 is an interaction diagram 5 of a multicast session establishment method according to an embodiment of this application. As shown in FIG. 15, the multicast session establishment method provided in this embodiment of this application includes the following steps.

S1501: The MB-NEF 410 receives a first request message from the application server 460.

The first request message may be the foregoing third message. The first request message is used to request to establish a multicast session. For example, the first request message may be a multicast session establishment request message. Establishing a multicast session means establishing a core network resource used for multicast transmission.

In this embodiment of this application, the first request message includes information about the multicast session. The information about the multicast session may include any one or more of the following: quality requirement information, transmission area information, and service identification information that are of the multicast session.

S1502: The MB-NEF 410 determines the MB-SMF 430 and the MB-PCF 420.

The MB-SMF 430 is configured to manage the multicast session. The MB-PCF 420 is configured to create a policy for the multicast session.

In this embodiment of this application, the MB-NEF 410 may determine the MB-SMF 430 based on the transmission area information included in the first request message and capability information of a plurality of SMFs in a transmission area indicated by the transmission area information.

In this embodiment of this application, the MB-NEF 410 may determine the MB-PCF 420 based on the transmission area information included in the first request message and capability information of a plurality of PCFs in the transmission area indicated by the transmission area information.

S1503: The MB-NEF 410 sends a second request message to the MB-PCF 420.

The second request message may be the first message shown in FIG. 5 or FIG. 6. The second request message is used to request the MB-PCF 420 to make a policy decision for the multicast session. For example, the second request message may be a policy request message.

In this embodiment of this application, the second request message includes identification information of the MB-SMF 430. The second request message may further include one or more of the quality requirement information, the transmission area information, and the service identification information that are of the multicast session. A policy requested by the second request message is used to specify, but not limited to, one or more of a rule for establishing a QoS flow, an authorized QoS rule, a rule for identifying multicast data, or a rule for filtering multicast data.

S1504: The MB-PCF 420 makes the policy decision for the multicast session.

The policy may include any one or more of the following: identification information of the multicast data, a multicast session quality parameter (namely, an authorized QoS parameter of the multicast data), or a multicast data filtering parameter. The identification information of the multicast data is used to identify multicast data from the application server 460. The multicast session quality parameter is used to specify transmission quality, for example, a transmission delay, a transmission rate, and a bandwidth, of the multicast data. The multicast data filtering parameter is used to specify a receiving parameter of the multicast data.

In this embodiment of this application, the MB-PCF 420 may create the policy for the multicast session based on information such as the quality requirement information and the service identification information that are of the multicast session.

Optionally, a mapping relationship between service identification information and a policy may be preconfigured in the MB-PCF 420. The MB-PCF 420 may obtain the policy of the multicast session based on the mapping relationship that is between service identification information and a policy and that is preconfigured in the MB-PCF 420.

Optionally, a mapping relationship between quality requirement information and a policy may be preconfigured in the MB-PCF 420. The MB-PCF 420 may obtain the policy of the multicast session based on the mapping relationship that is between quality requirement information and a policy and that is preconfigured in the MB-PCF 420.

S1505: The MB-PCF 420 sends a third request message to the MB-SMF 430.

The third request message may be the second message shown in FIG. 5 or FIG. 6. The third request message is used to request the MB-SMF 430 to establish the multicast session. For example, the third request message may be a multicast session establishment request message.

In this embodiment of this application, the third request message may include the policy created by the MB-PCF 420.

S1506: The MB-SMF 430 sends second information to an MB-UPF 440.

The second information is used by the MB-UPF 440 to identify the multicast data from the application server 460. The second information includes but is not limited to the service identification information.

In this embodiment of this application, the MB-UPF 440 may be determined by the MB-SMF 430 based on the transmission area information and capability information of a plurality of UPFs in the transmission area indicated by the transmission area information. The MB-UPF 440 is configured to identify the multicast data from the application server 460 based on the service identification information. The capability information of the UPF is used to indicate whether the UPF supports multicast data transmission.

Further, the second information may further include a charging rule of the multicast data. The charging rule may be from the third request message, and further be from the policy obtained by the MB-PCF 420. That is, the policy in S1504 may further include the charging rule of the multicast data. The MB-UPF 440 is further configured to charge the identified multicast data according to the charging rule of the multicast data. The capability information of the UPF is further used to indicate whether the UPF supports charging the multicast data.

In this embodiment of this application, the MB-SMF 430 may send the second information to the MB-UPF 440 based on an N4 session establishment message. N4 is a reference point between the MB-SMF 430 and the MB-UPF 440.

S1507: The MB-SMF 430 sends third information to a RAN 450.

The third information is used by the RAN 450 to perform multicast transmission configuration. The third information may include but is not limited to the policy created by the MB-PCF 420. The multicast transmission configuration includes but is not limited to any one or more of the following: establishing a context of multicast transmission, configuring a QoS parameter, or processing multicast data. For descriptions of the QoS parameter, refer to the descriptions in Embodiment 1. Details are not described herein again.

Further, the third information may further include the identification information of the multicast data. The identification information of the multicast data may be allocated by the MB-SMF 430. The identification information of the multicast data is used by the RAN 450 to identify corresponding multicast data from the MB-UPF 440. For example, the RAN 450 may send an IGMP join message to the MB-UPF 440 based on the identification information of the multicast data, and an intermediate router records a downlink transmission path.

In this embodiment of this application, the MB-SMF 430 may send the third information to the RAN 450 based on an N2 message. N2 is a reference point between the MB-SMF 430 and the RAN 450.

S1508: The MB-SMF 430 sends a first response message to the MB-NEF 410.

The first response message is used to indicate that the multicast session has been established. For example, the first response message may be a multicast session establishment response message. The first response message may include but is not limited to identification information of the MB-UPF 440.

S1509: The MB-NEF 410 sends a second response message to the application server 460.

The second response message is used to indicate that the multicast session has been established. For example, the second response message may be a multicast session establishment response message. The second response message may include but is not limited to the identification information of the MB-UPF 440.

Optionally, the multicast session establishment method provided in Embodiment 5 of this application further includes: The MB-PCF 420 allocates transaction identification information to the application server 460. The MB-PCF 420 stores first information.

The transaction identification information is used to identify the first information. The first information includes context information for establishing the multicast session. The context information for establishing the multicast session may include but is not limited to one or more of the transaction identification information, the policy, identification information of the application server 460, or the identification information of the MB-SMF 430.

Embodiment 6

In Embodiment 6, an application server 460 has a function of selecting an MB-PCF and an MB-SMF. The MB-PCF 420 has a function of policy management of a multicast session. The MB-SMF 430 has a function of multicast session management.

The policy management of the multicast session includes but is not limited to one or more of PCC, managing a QoS parameter of the multicast session, or managing a QoS flow generation rule. The multicast session management includes but is not limited to one or more of managing IP address allocation of the multicast session, selecting a user plane network element, or making a QoS flow generation decision.

In Embodiment 6, the application server 460 needs to establish the multicast session and simultaneously send multicast data to a specific area. A multicast session establishment process is as follows: The application server 460 determines the MB-PCF 420 configured to perform policy management of the multicast session, and determines the MB-SMF 430 configured to perform multicast session management (for example, multicast session establishment). The MB-PCF 420 makes a policy decision for the multicast session based on an indication of the application server 460. After the MB-PCF 420 completes the policy decision, the MB-SMF 430 establishes, according to the policy, the multicast session used to transmit the multicast data.

Figure 16:
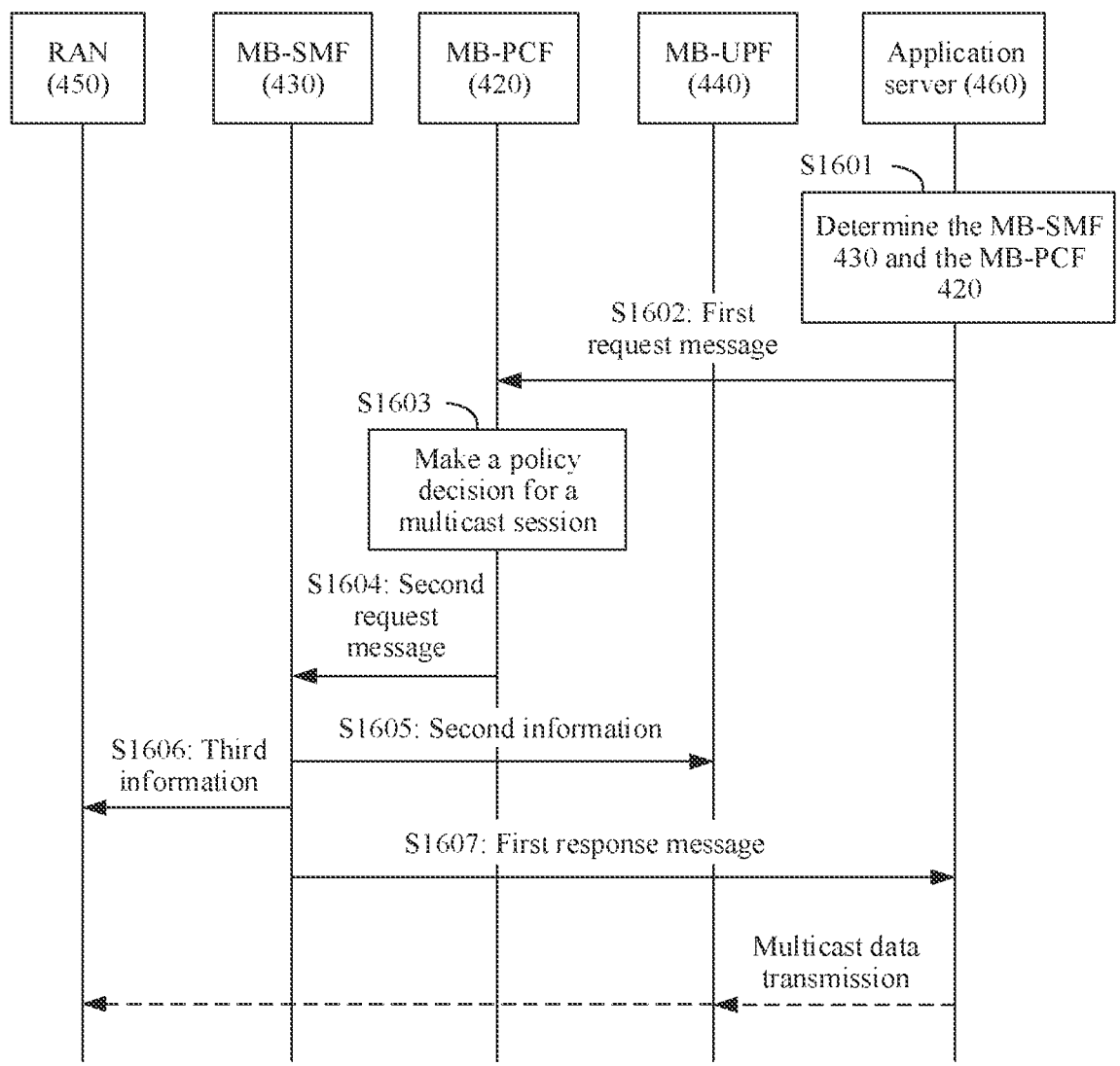
FIG. 16 is an interaction diagram 6 of a multicast session establishment method according to an embodiment of this application.

FIG. 16 is an interaction diagram 6 of a multicast session establishment method according to an embodiment of this application. As shown in FIG. 16, the multicast session establishment method provided in this embodiment of this application includes the following steps.

S1601: The application server 460 determines the MB-SMF 430 and the MB-PCF 420.

The MB-SMF 430 is configured to manage a multicast session. The MB-PCF 420 is configured to create a policy for the multicast session.

In this embodiment of this application, the application server 460 may determine the MB-SMF 430 based on transmission area information and capability information of a plurality of SMFs in a transmission area indicated by the transmission area information.

In this embodiment of this application, the application server 460 may determine the MB-PCF 420 based on the transmission area information and capability information of a plurality of PCFs in the transmission area indicated by the transmission area information.

S1602: The application server 460 sends a first request message to the MB-PCF 420.

The first request message may be the first message shown in FIG. 5 or FIG. 8. The first request message is used to request to establish the multicast session. For example, the first request message may be a multicast session establishment request message. Establishing a multicast session means establishing a core network resource used for multicast transmission.

In this embodiment of this application, the first request message includes information about the multicast session and identification information of the MB-SMF 430. The information about the multicast session may include any one or more of the following, quality requirement information, transmission area information, and service identification information that are of the multicast session.

S1603: The MB-PCF 420 makes a policy decision for the multicast session.

The policy may include any one or more of the following: identification information of the multicast data, a multicast session quality parameter (namely, an authorized QoS parameter of the multicast data), or a multicast data filtering parameter. The identification information of the multicast data is used to identify multicast data from the application server 460. The multicast session quality parameter is used to specify transmission quality, for example, a transmission delay, a transmission rate, and a bandwidth, of the multicast data. The multicast data filtering parameter is used to specify a receiving parameter of the multicast data.

In this embodiment of this application, the MB-PCF 420 may create the policy for the multicast session based on information such as the quality requirement information and the service identification information that are of the multicast session.

Optionally, a mapping relationship between service identification information and a policy may be preconfigured in the MB-PCF 420. The MB-PCF 420 may obtain the policy of the multicast session based on the mapping relationship that is between service identification information and a policy and that is preconfigured in the MB-PCF 420.

Optionally, a mapping relationship between quality requirement information and a policy may be preconfigured in the MB-PCF 420. The MB-PCF 420 may obtain the policy of the multicast session based on the mapping relationship that is between quality requirement information and a policy and that is preconfigured in the MB-PCF 420.

S1604: The MB-PCF 420 sends a second request message to the MB-SMF 430.

The second request message may be the second message shown in FIG. 5 or FIG. 8. The second request message is used to request to establish the multicast session. For example, the second request message may be a session request message.

In this embodiment of this application, the second request message includes some or all information in the policy obtained by the MB-PCF 420, or other information obtained by the MB-PCF 420.

S1605: The MB-SMF 430 sends second information to an MB-UPF 440.

The second information is used by the MB-UPF 440 to identify the multicast data from the application server 460. The second information includes but is not limited to the service identification information.

In this embodiment of this application, the MB-UPF 440 may be determined by the MB-SMF 430 based on the transmission area information and capability information of a plurality of UPFs in the transmission area indicated by the transmission area information. The MB-UPF 440 is configured to identify the multicast data from the application server 460 based on the service identification information. The capability information of the UPF is used to indicate whether the UPF supports multicast data transmission.

Further, the second information may further include a charging rule of the multicast data. The charging rule may be from the second request message, and further be from the policy obtained by the MB-PCF 420. That is, the policy in S1603 may further include the charging rule of the multicast data. The MB-UPF 440 is further configured to charge the identified multicast data according to the charging rule of the multicast data. The capability information of the UPF is further used to indicate whether the UPF supports charging the multicast data.

In this embodiment of this application, the MB-SMF 430 may send the second information to the MB-UPF 440 based on an N4 session establishment message. N4 is a reference point between the MB-SMF 430 and the MB-UPF 440.

S1606: The MB-SMF 430 sends third information to a RAN 450.

The third information is used by the RAN 450 to perform multicast transmission configuration. The third information may include but is not limited to the policy created by the MB-PCF 420. The multicast transmission configuration includes but is not limited to any one or more of the following: establishing a context of multicast transmission, configuring a QoS parameter, or processing multicast data. For descriptions of the QoS parameter, refer to the descriptions in Embodiment 1. Details are not described herein again.

Further, the third information may further include the identification information of the multicast data. The identification information of the multicast data may be allocated by the MB-SMF 430. The identification information of the multicast data is used by the RAN 450 to identify corresponding multicast data from the MB-UPF 440. For example, the RAN 450 may send an IGMP join message to the MB-UPF 440 based on the identification information of the multicast data, and an intermediate router records a downlink transmission path.

In this embodiment of this application, the MB-SMF 430 may send the third information to the RAN 450 based on an N2 message. N2 is a reference point between the MB-SMF 430 and the RAN 450.

S1607: The MB-SMF 430 sends a first response message to the application server 460.

The first response message is used to indicate that the multicast session has been established. For example, the first response message may be a multicast session establishment response message. The first response message may include but is not limited to identification information of the MB-UPF 440.

Optionally, the multicast session establishment method provided in Embodiment 6 of this application further includes: The MB-PCF 420 allocates transaction identification information to the application server 460. The MB-PCF 420 stores first information.

The transaction identification information is used to identify the first information. The first information includes context information for establishing the multicast session. The context information for establishing the multicast session may include but is not limited to one or more of the transaction identification information, the policy, identification information of the application server 460, or the identification information of the MB-SMF 430.

It should be noted that Embodiment 1, Embodiment 2, Embodiment 3, Embodiment 4, Embodiment 5, and Embodiment 6 in embodiments of this application are merely examples of several possible multicast session establishment methods. There may alternatively be another variation of the multicast session establishment method. This is not specifically limited in this embodiment of this application. For example, alternatively, the application server 460 may determine the MB-PCF 420 configured to perform policy management of the multicast session, and the MB-PCF 420 makes the policy decision for the multicast session based on the indication of the application server 460, and determines the MB-SMF 430 for multicast session management (such as the multicast session establishment). After the MB-PCF 420 completes the policy decision, the MB-SMF 430 establishes, according to the policy, the multicast session used to transmit the multicast data.

It may be understood that, to implement functions in any one of the foregoing embodiments, network elements such as the MB-PCF 420, MB-SMF 430, MB-NEF 410, the MB-UPF 440, the application server 460, and the RAN include corresponding hardware structures and/or software modules for performing the functions. A person skilled in the art should easily be aware that, in combination with the examples of units and algorithm steps described in embodiments disclosed in this specification, this application can be implemented by hardware or a combination form of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In this embodiment of this application, division into functional modules may be performed on network elements such as the MB-PCF 420, MB-SMF 430, MB-NEF 410, the MB-UPF 440, the application server 460, and the RAN. For example, each functional module may be obtained through division based on a corresponding function, or two or more functions may be integrated into one processing module. The integrated module may be implemented in a form of hardware, or may be implemented in a form of a software functional module. It should be noted that, in embodiments of this application, division into the modules is an example, and is merely a logical function division. In an actual implementation, another division manner may be used.

Figure 17:
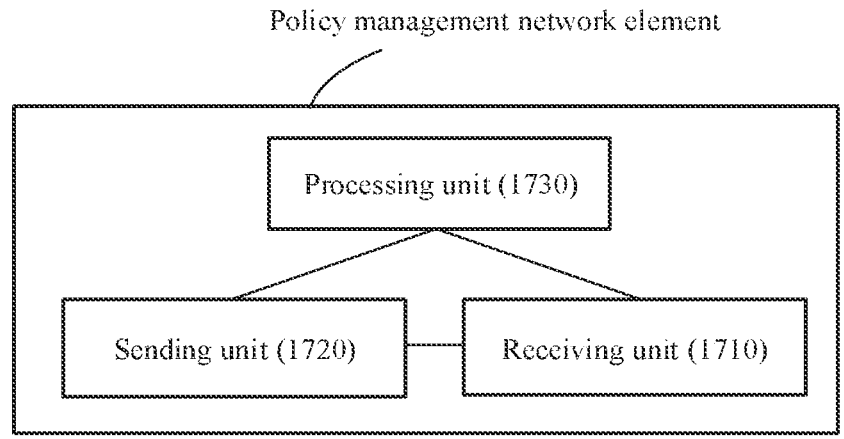
FIG. 17 is a schematic diagram of a structure of a policy management network element according to an embodiment of this application.

For example, when the functional modules are obtained through division in an integrated manner, FIG. 17 is a schematic diagram of a structure of a policy management network element according to an embodiment of this application. The policy management network element may include a receiving unit 1710, a sending unit 1720, and a processing unit 1730.

The receiving unit 1710 is configured to support the policy management network element in performing the foregoing steps S501, S1204, S1210, S1404, S1503, and S1602, and/or is used in another process of the technology described in this specification. The sending unit 1720 is configured to support the policy management network element in performing the foregoing steps S502, S601, S602, S801, S1105, S1207, S1406, S1505, and S1604, and/or is used in another process of the technology described in this specification. The processing unit 1730 is configured to support the policy management network element in performing the foregoing steps S701, S902, S1104, S1205, S1206, S1405, S1504, and S1603, and/or is used in another process of the technology described in this specification.

Figure 18:
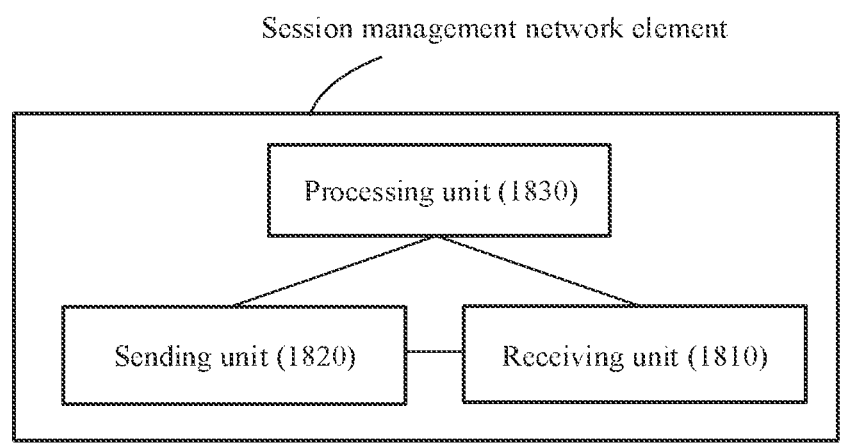
FIG. 18 is a schematic diagram of a structure of a session management network element according to an embodiment of this application.

FIG. 18 is a schematic diagram of a structure of a session management network element according to an embodiment of this application. The session management network element may include a receiving unit 1810, a sending unit 1820, and a processing unit 1830.

The receiving unit 1810 is configured to support the session management network element in performing the foregoing steps S901. S1108, S1201, S1304, S1403, S1406, S1505, and S1604, and/or is used in another process of the technology described in this specification. The sending unit 1820 is configured to support the session management network element in performing the foregoing steps S1109, S1110, S1111, S1208, S1209, S1210, S1211, S1306, S1308, S1404, S1407, S1408, S1409, S1506, S1507, S1508, S1605, S1606, and S1607, and/or is used in another process of the technology described in this specification. The processing unit 1830 is configured to support the session management network element in performing the foregoing steps S901, S902, S1001, and S1305, and/or is used in another process of the technology described in this specification.

Figure 19:
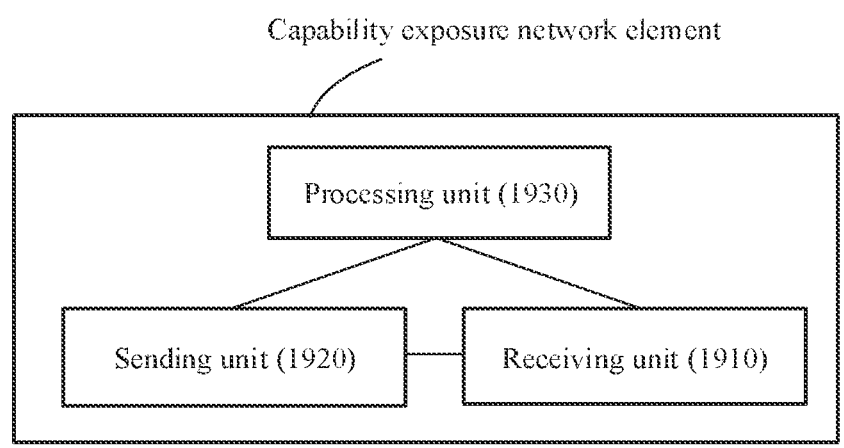
FIG. 19 is a schematic diagram of a structure of a capability exposure network element according to an embodiment of this application.

FIG. 19 is a schematic diagram of a structure of a capability exposure network element according to an embodiment of this application. The capability exposure network element may include a receiving unit 1910, a sending unit 1920, and a processing unit 1930.

The receiving unit 1910 is configured to support the capability exposure network element in performing the foregoing steps S1101, S1105, S1111, S1201, S1211. S1301, S1308, S1401, S1409. S1501, and S1508, and/or is used in another process of the technology described in this specification. The sending unit 1920 is configured to support the capability exposure network element in performing the foregoing steps S1103, S1108, S1112, S1204, S1212, S1304, S1309, S1403, S1410, S1503, and S1509, and/or is used in another process of the technology described in this specification. The processing unit 1930 is configured to support the capability exposure network element in performing the foregoing steps S1102, SI 106, S1107, S1202, S1203, S1302, S1303, S1402, and S1502, and/or is used in another process of the technology described in this specification.

It should be noted that, all related content of steps in the foregoing method embodiments may be cited in function descriptions of corresponding functional modules. Details are not described herein again.

It should be noted that the sending unit (1720, 1820, and 1920) and the receiving unit (1710, 1810, and 1910) may include a radio frequency circuit. Specifically, a network element may receive and send a radio signal by using a radio frequency circuit. The radio frequency circuit usually includes but is not limited to an antenna, at least one amplifier, a transceiver, a coupler, a low noise amplifier, a duplexer, and the like. In addition, the radio frequency circuit may further communicate with another device through wireless communication. The wireless communication may use any communication standard or protocol, including but not limited to a global system for mobile communications, a general packet radio service, code division multiple access, wideband code division multiple access, long term evolution, an email, a short message service, and the like.

For structures of network elements such as the MB-UPF 440, the application server 460, and the RAN, refer to the schematic diagrams of structures shown in FIG. 17, FIG. 18, and FIG. 19. Details are not described in this embodiment of this application.

In an optional manner, when software is used to implement data transmission, the data transmission may be implemented completely or partially in a form of a computer program product. The computer program product includes one or more computer instructions. When the computer program instructions are loaded and executed on a computer, the procedures or the functions according to embodiments of this application are all or partially implemented. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive Solid-State Drive (SSD)), or the like.

Method or algorithm steps described in combination with embodiments of this application may be implemented by hardware, or may be implemented by a processor by executing software instructions. The software instructions may include a corresponding software module. The software module may be stored in a RAM memory, a flash memory, a ROM memory, an EPROM memory, an EEPROM memory, a register, a hard disk, a removable hard disk, a CD-ROM memory, or a storage medium in any other form well-known in the art. For example, a storage medium is coupled to a processor, so that the processor can read information from the storage medium or write information into the storage medium. Certainly, the storage medium may be a component of the processor. The processor and the storage medium may be located in an ASIC. In addition, the ASIC may be located in a detection apparatus. Certainly, the processor and the storage medium may alternatively exist in the detection apparatus as discrete components.

Based on the foregoing descriptions of the implementations, a person skilled in the art may clearly understand that for the purpose of convenient and brief descriptions, division into the foregoing functional modules is merely used as an example for descriptions. During actual application, the foregoing functions can be allocated to different functional modules for implementation based on a requirement, in other words, an inner structure of an apparatus is divided into different functional modules to implement all or a part of the functions described above.

In the several embodiments provided in this application, it should be understood that the disclosed user equipment and method may be implemented in other manners. For example, the described apparatus embodiments are merely examples. For example, the module or unit division is merely logical function division and may be other division during actual implementation. For example, a plurality of units or components may be combined or integrated into another apparatus, or some features may be ignored or not performed. In addition, the displayed or discussed mutual couplings or direct couplings or communication connections may be implemented by using some interfaces. The indirect couplings or communication connections between the apparatuses or units may be implemented in electrical, mechanical, or other forms.

The units described as separate parts may or may not be physically separate, and parts displayed as units may be one or more physical units, in other words, may be located in one place, or may be distributed on different places. Some or all of the units may be selected based on an actual requirement to achieve the objectives of the solutions in embodiments.

In addition, functional units in embodiments of this application may be integrated into one processing unit, or each of the units may exist alone physically, or two or more units may be integrated into one unit. The integrated unit may be implemented in a form of hardware, or may be implemented in a form of a software functional unit.

When the integrated unit is implemented in the form of a software functional unit and sold or used as an independent product, the integrated unit may be stored in a readable storage medium. Based on such an understanding, the technical solutions in embodiments of this application essentially, or the part contributing to a conventional technology, or all or a part of the technical solutions may be implemented in the form of a software product. The software product is stored in a storage medium and includes several instructions for instructing a device (which may be a singlechip microcomputer, a chip or the like) or a processor to perform all or a part of the steps of the methods described in embodiments of this application. The foregoing storage medium includes: any medium that can store program code, for example, a USB flash drive, a removable hard disk, a read-only memory (ROM), a random access memory (RAM), a magnetic disk, or an optical disc.

The foregoing descriptions are only specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A multicast session establishment method, wherein the method comprises:

receiving, by a policy control network element, a first message from a session management network element, wherein the first message comprises information about a multicast session, wherein the information about the multicast session comprises quality requirement information of the multicast session, wherein the quality requirement information comprises a quality requirement index that represents a set of quality of service (QOS) requirements;

obtaining, by the policy control network element based on at least the quality requirement information of the multicast session received in the first message, a policy of the multicast session; and sending, by the policy control network element, a second message to the session management network element, wherein the second message comprises the policy of the multicast session.

2. The method according to claim 1, wherein the first message requests to make a policy decision for the multicast session.

3. The method according to claim 1, wherein the information about the multicast session further includes service identification information that comprises an internet protocol (IP) address and a port number of an application server.

4. The method according to claim 1, wherein the policy comprises one or more of the following: identification information of multicast data or a multicast session quality parameter, wherein the identification information of the multicast data identifies multicast data from an application server.

5. The method according to claim 1, wherein the quality requirement index included in the first message comprises a 5QI.

6. A policy control network element, comprising:
at least one processor; and
a memory coupled to the at least one processor and storing executable instructions for execution by the at least one processor to instruct the at least one processor to:
receive a first message from a session management network element, wherein the first message comprises information about a multicast session, wherein the information about the multicast session comprises quality requirement information of the multicast session, wherein the quality requirement information comprises a quality requirement index that represents a set of quality of service (QOS) requirements;

obtain, based on at least the quality requirement information of the multicast session received in the first message, a policy of the multicast session; and send a second message to the session management network element, wherein the second message comprises the policy of the multicast session.

7. The policy control network element according to claim 6, wherein the first message requests to make a policy decision for the multicast session.

8. The policy control network element according to claim 6, wherein the information about the multicast session further includes service identification information that comprises an internet protocol (IP) address and a port number of an application server.

9. The policy control network element according to claim 6, wherein the policy comprises one or more of the following: identification information of multicast data or a multicast session quality parameter, wherein the identification information of the multicast data identifies multicast data from an application server.

10. A multicast session establishment system, comprising: a policy control network element and a session management network element, wherein the session management network element is configured to: send a first message to the policy control network element, wherein the first message comprises information about a multicast session, wherein the information about the multicast session comprises quality requirement information of the multicast session, wherein the quality requirement information comprises a quality requirement index that represents a set of quality of service (QOS) requirements; and the policy control network element is configured to: receive the first message; obtain a policy of the multicast session, based on at least the quality requirement information of the multicast session received in the first message; and send a second message to the session management network element, wherein the second message comprises the policy of the multicast session.

11. The system according to claim 10, wherein the first message requests to make a policy decision for the multicast session.

12. The system according to claim 10, wherein the information about the multicast session further includes service identification information that comprises an internet protocol (IP) address and a port number of an application server.

13. The system according to claim 10, wherein the policy comprises one or more of the following: identification information of multicast data or a multicast session quality parameter, wherein the identification information of the multicast data identifies multicast data from an application server.

* * * * *

UNITED STATES PATENT AND TRADEMARK OFFICE
CERTIFICATE OF CORRECTION

| | | |
|---|---|---|
| PATENT NO. | : 12,238,154 B2 | Page 1 of 1 |
| APPLICATION NO. | : 17/736449 | |
| DATED | : February 25, 2025 | |
| INVENTOR(S) | : Meng Li, Haiyang Sun and Yizhuang Wu | |

It is certified that error appears in the above-identified patent and that said Letters Patent is hereby corrected as shown below:

In the Claims

In Column 49, In Line 26, In Claim 1, delete "(QOS)" and insert -- (QoS) --.

In Column 50, In Line 5, In Claim 6, delete "(QOS)" and insert -- (QoS) --.

In Column 50, In Line 37, In Claim 10, delete "(QOS)" and insert -- (QoS) --.

Signed and Sealed this
Twenty-second Day of July, 2025

Coke Morgan Stewart
*Acting Director of the United States Patent and Trademark Office*